United States Patent
Zhang et al.

(10) Patent No.: US 12,501,356 B2
(45) Date of Patent: Dec. 16, 2025

(54) ENERGY-SAVING METHOD, BASE STATION, CONTROL UNIT, AND STORAGE MEDIUM

(71) Applicant: ZTE Corporation, Shenzhen (CN)

(72) Inventors: Bo Zhang, Shenzhen (CN); Yazhu Ke, Shenzhen (CN); Chenhong Zhang, Shenzhen (CN); Peng Zhou, Shenzhen (CN); Shaojiang Wang, Shenzhen (CN)

(73) Assignee: ZTE CORPORATION, Shenzhen (CN)

( * ) Notice: Subject to any disclaimer, the term of this patent is extended or adjusted under 35 U.S.C. 154(b) by 480 days.

(21) Appl. No.: 17/918,960

(22) PCT Filed: Apr. 16, 2021

(86) PCT No.: PCT/CN2021/087665
§ 371 (c)(1),
(2) Date: Oct. 14, 2022

(87) PCT Pub. No.: WO2021/209024
PCT Pub. Date: Oct. 21, 2021

(65) Prior Publication Data
US 2023/0239784 A1    Jul. 27, 2023

(30) Foreign Application Priority Data
Apr. 17, 2020 (CN) .......................... 202010305598.0

(51) Int. Cl.
*H04W 52/02* (2009.01)
(52) U.S. Cl.
CPC .............................. *H04W 52/0206* (2013.01)

(58) Field of Classification Search
CPC ................................................ H04W 52/0206
See application file for complete search history.

(56) References Cited

U.S. PATENT DOCUMENTS

| 10,366,362 B1 | 7/2019 | Reddy |
| 2013/0109373 A1 | 5/2013 | Watanabe |

(Continued)

FOREIGN PATENT DOCUMENTS

| CN | 102083149 A | 6/2011 |
| CN | 102388643 A | 3/2012 |

(Continued)

OTHER PUBLICATIONS

Bo Ma, "A Survey of Online Data-Driven Proactive 5G Network Optimization Using Machine Learning", IEEE Access, vol. 8, 2020.

(Continued)

*Primary Examiner* — Gbemileke J Onamuti
(74) *Attorney, Agent, or Firm* — CANTOR COLBURN LLP

(57) ABSTRACT

Provided are an energy-saving method, a base station, a control unit, and a storage medium. The method includes: collecting energy-consumption influencing factor data of a target cell; predicting a load trend of the target cell according to the energy-consumption influencing factor data; and determining, according to the load trend, an energy-saving strategy of the target cell and effective time corresponding to the energy-saving strategy and executing the energy-saving strategy according to the effective time.

17 Claims, 7 Drawing Sheets

(56) References Cited

U.S. PATENT DOCUMENTS

| | | | | |
|---|---|---|---|---|
| 2013/0142221 A1* | 6/2013 | Xia | ........................ | H04L 1/005 375/150 |
| 2015/0156714 A1* | 6/2015 | Xia | ...................... | H04W 24/08 455/574 |
| 2016/0219563 A1* | 7/2016 | Sayeed | ................ | H04L 1/0007 |

FOREIGN PATENT DOCUMENTS

| | | | | |
|---|---|---|---|---|
| CN | 107426759 A | 12/2017 | | |
| CN | 108271184 A | 7/2018 | | |
| CN | 109996246 A | 7/2019 | | |
| CN | 110084406 A | 8/2019 | | |
| CN | 111010700 A | 4/2020 | | |
| CN | 111010725 A | 4/2020 | | |
| EP | 2919531 A1 | 9/2015 | | |
| EP | 2912890 B1 * | 1/2020 | ............ | H04W 24/02 |
| WO | 2013154186 A1 | 10/2013 | | |

OTHER PUBLICATIONS

European Search Report for corresponding application EP21787540; Report dated Apr. 9, 2024.

Chinese Office Action for corresponding Chinese Application 2020103055980; dated Aug. 22, 2024.

Search Report for corresponding Chinese Application 2020103055980; dated Aug. 21, 2024.

International Search Report for corresponding application PCT/CN2021/087665 filed Apr. 16, 2021; Mail date Jul. 2, 2021.

Chinese Office Action for Application No. 202010305598.0, dated Feb. 8, 2025, 12 pages with translation.

Chinese Supplemental Search Report for Application No. 202010305598.0, dated Feb. 5, 2025, 6 pages with translation.

Liang Xiongjian, "Telecommunication network planning" Forecast of local telephone service development, accessed Feb. 5, 2025, 3 pages with translation.

* cited by examiner

ENERGY-SAVING METHOD, BASE STATION, CONTROL UNIT, AND STORAGE MEDIUM

CROSS-REFERENCE TO RELATED APPLICATIONS

This is a National Stage Application filed under 35 U.S.C. 371 based on International Patent Application No. PCT/CN2021/087665, filed on Apr. 16, 2021, which claims priority to Chinese Patent Application No. 202010305598.0 filed on Apr. 17, 2020, the disclosures of both of which are incorporated herein by reference in their entireties.

TECHNICAL FIELD

The present application relates to a wireless communication network and, for example, an energy-saving method, a base station, a control unit, and a storage medium.

BACKGROUND

In network operations, electricity bills are the maximum network maintenance costs paid by multiple operators. With the rapid evolution of a wireless network system, the power consumption of a base station is also greatly improved, which occupies a large proportion in a wireless communication network. For example, main devices of the base station such as a radio remote unit (RRU) and a building baseband unit (BBU) have relatively high energy consumption. Therefore, it is necessary to turn off part of network resources on a base station side, so as to reduce the energy consumption of the base station.

In the related art, typically, the base station is configured, according to a network situation and personnel experience, with a time period in which energy can be saved. When the base station enters the time period in which the energy can be saved, it is considered that a network resource occupation rate on the base station side is relatively low and service requirements can be satisfied by using small part of resources on a network side. Therefore, the part of the network resources on the base station side is turned off, thereby saving radio frequency resources and the energy consumption of a power amplifier. However, the time period in which the energy can be saved determined according to the network situation and the personnel experience is not accurate, and the configured time period in which the energy can be saved is also fixed, so the variability of an actual network environment is ignored. Multiple cells covered by multiple base stations may have different time periods when the energy can be saved, so it is difficult to implement a uniform and efficient configuration of the time periods when the energy can be saved. In addition, with the evolution of network construction, the amount of cell services increases continuously and changes in real time, so a specified configuration cannot adapt to a large number of service changes and cannot cope with various unexpected events. Therefore, the energy consumption of the base station is controlled in an inflexible manner with relatively low efficiency.

SUMMARY

The present application provides an energy-saving method, a base station, a control unit, and a storage medium, so as to improve energy-saving flexibility and effectively reduce the energy consumption of the base station.

Embodiments of the present application provide an energy-saving method applied to a base station. The energy-saving method includes: collecting energy-consumption influencing factor data of a target cell; predicting a load trend of the target cell according to the energy-consumption influencing factor data; and determining, according to the load trend, an energy-saving strategy of the target cell and effective time corresponding to the energy-saving strategy and executing the energy-saving strategy according to the effective time.

Embodiments of the present application further provide an energy-saving method applied to a control unit. The energy-saving method includes: collecting energy-consumption influencing factor data of a target cell; predicting a load trend of the target cell according to the energy-consumption influencing factor data; determining, according to the load trend, an energy-saving strategy of the target cell and effective time corresponding to the energy-saving strategy; and indicating the energy-saving strategy and the effective time to a base station.

Embodiments of the present application further provide a base station including one or more processors and a storage apparatus that is configured to store one or more programs. When executed by the one or more processors, the one or more programs cause the one or more processors to implement the preceding energy-saving method applied to a base station.

Embodiments of the present application further provide a control unit including one or more processors and a storage apparatus that is configured to store one or more programs. When executed by the one or more processors, the one or more programs cause the one or more processors to implement the preceding energy-saving method applied to a control unit.

Embodiments of the present application further provide a non-transitory computer-readable storage medium for storing computer programs that, when executed by a processor, implement the preceding energy-saving method.

DETAILED DESCRIPTION

Figure 1:
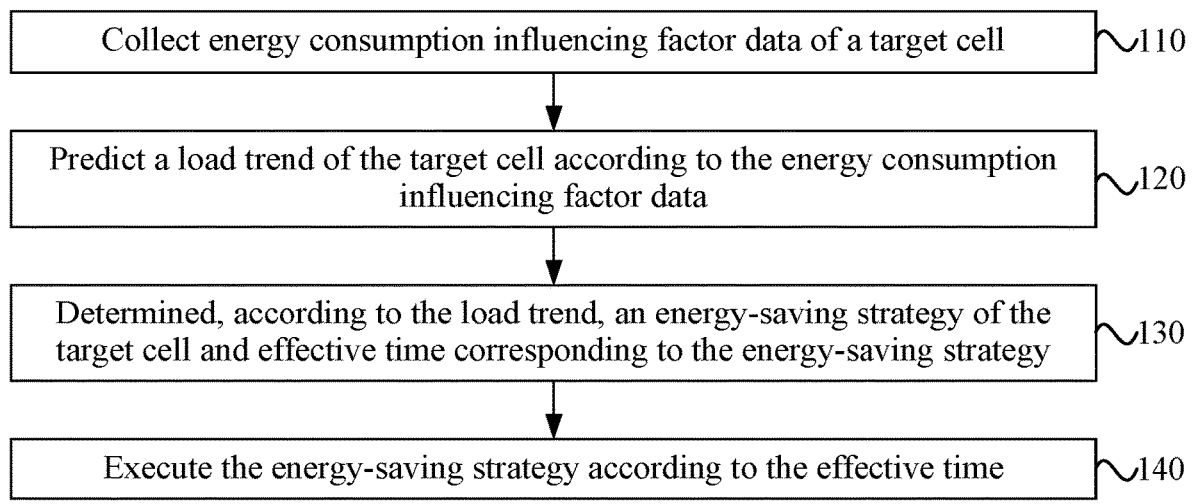
FIG. 1 is a flowchart of an energy-saving method applied to a base station according to an embodiment.

The present application is described hereinafter in conjunction with drawings and embodiments. It is to be understood that the embodiments described herein are intended to explain the present application and not to limit the present application. For ease of description, only part, not all, of structures related to the present application are illustrated in the drawings.

In embodiments of the present application, an energy-saving method applied to a base station is provided, where the base station predicts a load trend of a target cell according to energy-consumption influencing factor data of the target cell and determines an executable energy-saving strategy of the target cell and effective time of the strategy according to the predicted load trend. According to the method, an actual situation in a network environment is considered and a respective energy-saving strategy can be flexibly executed at specific effective time so that the energy consumption of the base station is effectively reduced.

FIG. 1 is a flowchart of an energy-saving method applied to a base station according to an embodiment. As shown in FIG. 1, the method provided in this embodiment includes S110 to S140.

In S110, energy-consumption influencing factor data of a target cell is collected.

In this embodiment, the target cell refers to a cell whose load trend is to be predicted or a cell for which an energy-saving strategy may be set. The energy-consumption influencing factor data refers to data that has an influence on the energy consumption of the target cell. The energy-consumption influencing factor data may be used for the subsequent decision-making on the energy-saving strategy and includes factors such as the number of users, throughput, and weather. If the number of users or throughput of the target cell in a time period is relatively high, no energy-saving strategy is adopted in this time period in order to ensure a quality of service, but if the number of users or throughput is below a certain threshold in a time period (for example, during the night of a working day), part of network-side resources may be turned off in this time period to save energy. For example, in the case of poor weather conditions (such as heavy rain and heavy fog) at the weekend, cells in a residential area have relatively high loads and no energy-saving strategy is adopted, but cells in a scenic spot area have relatively low loads and part of network-side resources may be turned off to save the energy.

The target cell may be one or more cells in the coverage range of the base station. When the target cell includes multiple cells, the multiple cells may be grouped according to energy-consumption influencing factor data of the multiple cells. Cells with similar energy-consumption influencing factor data are divided into one target cell group, and the cells in the target cell group in a future period of time have similar load trends. Therefore, a uniform prediction may be performed on the target cell group according to the mean of the energy-consumption influencing factor datas of the multiple cells in the target cell group, statistics of the energy-consumption influencing factor datas, and the like. Finally, the multiple cells in the target cell group may adopt the same energy-saving strategy and the same effective time.

In S120, a load trend of the target cell is predicted according to the energy-consumption influencing factor data.

In this embodiment, energy-consumption influencing factor data corresponding to each time granularity (for example, each hour) of the target cell in a past period of time (for example, one month) may be collected, and the load trend of the target cell in the future may be predicted through a machine learning prediction model or the like. For example, a load factor value of each time granularity (for example, each hour) of the target cell in a future period of time (for example, one week) is predicted according to periodic characteristics and development trend characteristics (for example, data about a factor continues to rise or fall smoothly, rises or falls rapidly, fluctuates within a certain range, rises or falls regularly according to a certain period, or the like) of the energy-consumption influencing factor data.

In S130, an energy-saving strategy of the target cell and effective time corresponding to the energy-saving strategy are determined according to the load trend.

In this embodiment, a most appropriate energy-saving strategy and respective effective time are determined according to the predicted load trend to save the energy maximally. For example, the load factor value of each time granularity (for example, each hour) of the target cell in the future period of time (for example, one week) is predicted such that it may be determined that a load factor value during 8:00 to 12:00 on a second day in the future is below a certain threshold. Thus, it may be determined that an appropriate energy-saving strategy needs to be executed in this time period to save the energy, and it may be determined that the execution of the energy-saving strategy is stopped at the end of this time period and network-side resources turned off are restored to satisfy service requirements and ensure the quality of service.

In S140, the energy-saving strategy is executed according to the effective time.

According to the energy-saving method of this embodiment, the load trend of the target cell (or the target cell group) in the future may be predicted based on historical load information of the target cell (or the target cell group) and other additional information of the target cell (or the target cell group), and the predicted future load information is applied to the decision-making on the energy-saving strategy such that the energy-saving strategy that can be adopted in the future and the respective effective time period is determined. When the energy needs to be saved, the energy-saving strategy is executed. When necessary, the execution of the energy-saving strategy is stopped and normal working states of the base station and a network side are restored so that the energy consumption is flexibly controlled according to actual network situations of the target cell and in the case where it is ensured that service requirements of the service are satisfied, the energy consumption can be effectively reduced.

The preceding energy-saving method is applicable to the base station. For example, under a distributed network structure and framework, multiple base stations may independently make decisions and control energy consumption according to actual network situations of target cells in their own coverage ranges. In some embodiments, for example, in an application scenario of a centralized network architecture, the collection of the energy-consumption influencing factor data and the prediction of the load trend may be implemented through a centralized control unit. The control unit may be, for example, a network management device or a mobile edge computing (MEC) data platform, a network element or a centralized management server, or the like. In this case, the control unit may collect data of target cells in coverage ranges of all base stations in an area that the control unit is responsible for, may predict a load trend (may also determine an energy-saving strategy) for target cells of each base station, and then may indicate the load trend (or the energy-saving strategy) to a respective base station. Each base station manages the target cells in its coverage range according to the energy-saving strategy, thereby implementing energy-saving control. The control unit may indicate the predicted load trend to the base station, and the base station determines the energy-saving strategy and the effective time and executes the energy-saving strategy. Thus, data of different base stations is synthesized and mutual influences and correlations of the different base stations are considered to perform uniform energy-saving and decision-making. In some embodiments, the control unit may also collect the data, predict the load trend, determine the energy-saving strategy and the effective time, and indicate the energy-saving strategy and the effective time to the base station. The base station directly receives the energy-saving strategy and the effective time and executes the energy-saving strategy accordingly, which reduces a workload of the base station to a certain extent and improves the execution efficiency in the determination of the energy-saving strategy.

In an embodiment, the energy-consumption influencing factor data includes at least one of: load information of the target cell, load information of a neighbor cell, or information about a non-network factor, where the load information of the neighbor cell includes load information generated by service handover between the target cell and the neighbor cell.

In this embodiment, the energy-consumption influencing factor data includes a variety of load information of the target cell such as an uplink physical resource block (PRB) utilization rate or a downlink PRB utilization rate, the number of radio resource control (RRC) users, the throughput, and a user rate.

The energy-consumption influencing factor data may also include the load information of the neighbor cell, where the neighbor cell refers to a cell that has a load influence on the target cell. The neighbor cell may be a cell close to the geographical location of the target cell or a cell that has service handover or user handover with the target cell. The neighbor cell may be a cell in the coverage range of the base station or a cell outside the coverage range of the base station. Loads of the target cell mainly include two parts: a first part is a load generated by a service initiated by an idle-state user in the target cell, and a second part is a load generated by a user in the handover between the cell and the neighbor cell, where the user in the handover causes the loads of the target cell and loads of the neighbor cell to vary. In this embodiment, when the load trend of the target cell is predicted, the load information of the neighbor cell is considered and spatial information (that is, the relationship between a serving cell and its surrounding neighbor cell and the load information of the neighbor cell) is used for a load prediction and the decision-making on the energy saving, so as to improve the accuracy of the load prediction. In some embodiments, the energy-consumption influencing factor data may further include the geographical location of the target cell, a neighbor cell relationship to which the target cell belongs, the geographical location of the neighbor cell, and the like. The information may be used for the determination of the neighbor cell of the target cell, and the information and the load information of the neighbor cell may be uniformly classified as cell network planning information.

The energy-consumption influencing factor data may further include the information about the non-network factor such as weather, time lists of special events, road traffic congestion, special holidays, or important activities. Under different weather conditions and different traffic conditions and during different holidays, a network load has different variation trends and features. In the process in which a prediction model is built, these factors are considered so that the accuracy of a prediction through the model can be improved. The information about the non-network factor is used for the prediction of the load trend and the decision-making on the energy saving so that the comprehensiveness of the load prediction and the reliability of the energy-saving strategy are improved.

In an embodiment, the method further includes S101 in which the cells in the coverage range are ranked according to the number of times of service handover performed between the target cell and each of the cells or the distance between the target cell and each of the cells and the set number of cells ranked first are determined as neighbor cells.

In this embodiment, a cell that has an influence or a greatest influence on the load trend of the target cell is selected as the neighbor cell based on a certain criterion. For example, other cells are ranked in descending order according to the number of times of service handover performed between the target cell and each of the other cells, and five cells with a largest number of times of service handover are selected as the neighbor cells of the target cell. Alternatively, other cells are ranked according to the distance between the target cell and each of the other cells from near to far, and five closest cells are selected as the neighbor cells of the target cell. Alternatively, other cells may be ranked according to the number of times of service handover and the distance, ranking priorities may be set for the number of times of service handover and the distance or weights may be respectively set for the number of times of service handover and the distance, and the set number of cells ranked first are synthetically determined as the neighbor cells so that the load trend of the target cell is predicted comprehensively and effectively.

In an embodiment, the method further includes S102 in which time to predict the load trend and/or a period to predict the load trend are determined according to a variation frequency of the load information of the target cell and a variation amplitude of the load information of the target cell.

In this embodiment, the variation frequency of the load information of the target cell and the variation amplitude of the load information of the target cell in a past period of time may be determined according to the collected energy-consumption influencing factor data. If the variation frequency of the load information is relatively high, a frequency with which the load trend is predicted may be increased accordingly or the period to predict the load trend may be accordingly shortened (for example, the load trend is predicted once a day and the energy-saving strategy and the effective time are updated). If the variation frequency of the load information is relatively low, the frequency with which the load trend is predicted may be reduced or the period to predict the load trend may be increased (for example, the load trend is predicted once a week and the energy-saving strategy and the effective time are updated). If the variation amplitude of the load information is relatively large, the frequency with which the load trend is predicted may be increased accordingly or the period to predict the load trend may be accordingly shortened. If the variation amplitude of the load information is relatively small, the frequency with which the load trend is predicted may be reduced or the period to predict the load trend may be increased. Alternatively, the time to predict the load trend and/or the period to predict the load trend may also be determined according to both the variation frequency of the load information and the variation amplitude of the load information. In some embodiments, the base station may perform the prediction or the decision-making at the time when the target cell has a lowest load in a day, for example, in the early morning or at night, so as to avoid the time when the amount of user services is relatively large. Thus, the case is avoided where excessive computing resources are occupied by the prediction process and a normal progress of a user service is influenced.

In an embodiment, the method further includes S103 in which the target cell is divided according to a time characteristic of the energy-consumption influencing factor data, where the target cell includes at least one cell.

In wireless networks, loads of a large number of cells present similar trends as a function of time. In this embodiment, all cells to be predicted may be divided into cell group levels or cell levels. If a load at a cell group level is predicted, load information of the multiple cells in the target cell group needs to be aggregated and computed according to a certain rule, so as to characterize load characteristics of the target cell group. Multiple cells that have similar energy-consumption influencing factor data are jointly modeled and predicted, and cells whose loads have similar time attributes are classified into one class according to a certain strategy such that the cells in the coverage range of the base station are divided into multiple target cell groups. In an embodiment, when the cells that have the similar time attributes are divided into the target cell groups, a machine learning algorithm such as a k-means clustering algorithm may be adopted. For example, Cell 1, Cell 2, and Cell 3 are divided into Category 1, and Cell 4 and Cell 5 are divided into Category 2. The number of cells contained in each target cell group is not limited. The uniform prediction and decision-making are performed on the basis of the target cell group, which reduces computing amount, avoids unnecessary work, and improves prediction efficiency.

Figure 2:
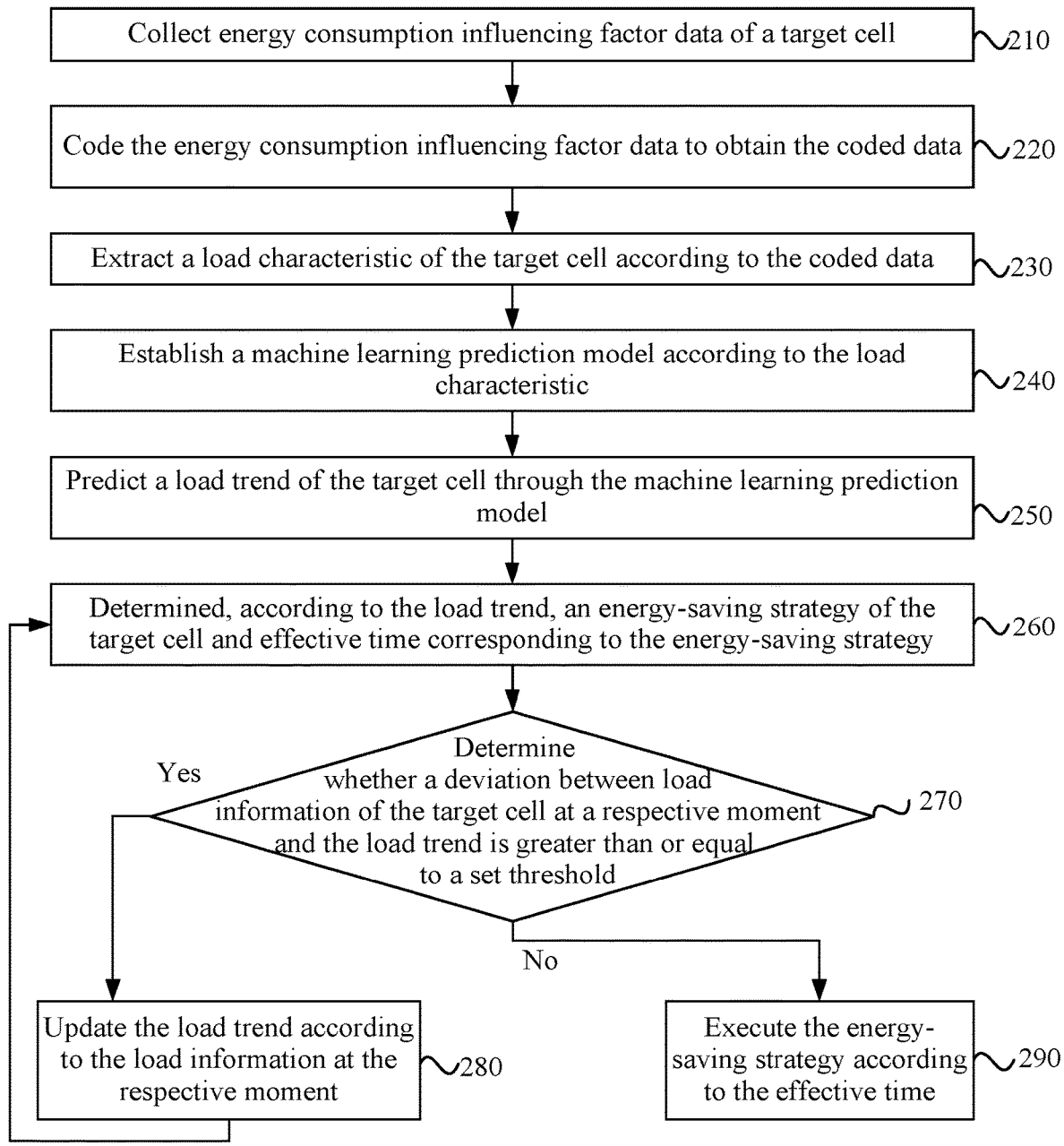
FIG. 2 is a flowchart of an energy-saving method applied to a base station according to another embodiment.

FIG. 2 is a flowchart of an energy-saving method applied to a base station according to another embodiment. As shown in FIG. 2, the method includes S210 to S290.

In S210, energy-consumption influencing factor data of a target cell is collected.

In this embodiment, the energy-consumption influencing factor data includes and is not limited to the following data: historical load information of the target cell (including, for example, an uplink PRB utilization rate, a downlink PRB utilization rate, the number of RRC users, throughput, average rate factors), load information of a neighbor cell, a weather factor (including different types of weather such as snowy days and sunny days), a road traffic factor (including deployment locations of different roads, congestion of different roads, and the like), a holiday factor (including working days, weekends, statutory holidays, and the like), an important event factor (special events such as contests or travel restrictions). The energy-consumption influencing factor data includes data in a past period of time (for example, six months), and a collection time granularity may be one hour or the like.

When a load trend of the target cell is predicted, load factors to be predicted are selected. For example, the predicted load trend may include the following load factors: the uplink PRB utilization rate, the downlink PRB utilization rate, and the number of RRC users. Data about these load factors are used as a basis for determining a load degree of the target cell in a future period of time.

In S220, the energy-consumption influencing factor data is coded such that the coded data is obtained.

In this embodiment, the energy-consumption influencing factor data is coded, which facilitates the extraction of load characteristics and the prediction of the load trend through modeling. Historical weather information of the target cell captured based on a weather website in a past period of time is used as an example. Each item of weather data may be coded in the manner shown in Table 1.

TABLE 1

Coding of the weather data in the energy-consumption influencing factor data

| Indicator of weather data | Coding description |
|---|---|
| Weather condition | 0: Clear 1: Cloudy 2: Overcast 3: Light rain 4: Moderate rain 5: Heavy Rain 6. Snowy 7: Clear to cloudy/Cloudy to clear 8: Clear to overcast/Over cast to clear 9. Overcast to rain/Rain to overcast 10: Sleet 11: Others |
| Minimum temperature | 0: (−∞, −20] degrees 1: (−20, −10] degrees 2: (−10, 0] degrees 3: (0, 10] degrees 4: (10, 20] degrees 5: (20, 30] degrees 6: (30, 40] degrees 7: (40, +∞] degrees |
| Maximum temperature | 0: (−∞, −20] degrees 1: (−20, −10] degrees 2: (−10, 0] degrees 3: (0, 10] degrees 4: (10, 20] degrees 5: (20, 30] degrees 6: (30, 40] degrees 7: (40, +∞] degrees |
| PM2.5 index | 0: (−∞, 50] 1: (50, 100] 2: (100, 150] 3: (150, 200] 4: (200, 300] 5: (300, +oo] |
| Wind scale | 0-12 corresponds to 0-12 level wind. |
| Precipitation | 0: (−∞, 10] mm 1: (10, 25] mm 2: (25, 50] mm 3: (50, 100] mm 4: (100, 200] mm 5: (200, +∞] mm |

In S230, a load characteristic of the target cell is extracted according to the coded data.

In this embodiment, the load characteristic (mainly referring to a time series characteristic of a load as a function of time) is extracted according to the coded energy-consumption influencing factor data, and a model is made according to the load characteristic. The load characteristic includes, but is not limited to, a trend characteristic as a function of time and a periodic characteristic. For example, in a specific time period, the load continues to rise or fall smoothly, rises or falls rapidly, fluctuates within a certain range, rises or falls regularly according to a certain period, or the like. In an embodiment, S230 includes that in the case where at least two target cells exist, a centroid of a clustering algorithm corresponding to the multiple target cells is used as the load characteristic, or the mean or median of the energy-consumption influencing factor data of the multiple target cells is used as the load characteristic.

In this embodiment, in the case where the multiple target cells exist, that is, the decision-making on energy saving and the prediction are performed for a target cell group, a certain strategy is adopted to characterize load attributes of the target cell group. For example, the clustering algorithm is adopted to perform division such that at least one target cell group is obtained. The load characteristic of the target cell is determined with a centroid of a class corresponding to the target cell group in a clustering process, or the load characteristic of the target cell is determined with the mean or median of the energy-consumption influencing factor data of all target cells in the target cell group.

In S240, a machine learning prediction model is established according to the load characteristic.

In this embodiment, according to the load attributes of the target cell, a time series characteristic of load attributes of the target cell is extracted, and different prediction algorithms are adopted for the modeling.

Table 2 is a mapping table of load characteristics and prediction models. As shown in Table 2, if load information of the target cell and weather factors of the target cell have periodic characteristics and trend characteristics as the load characteristics (for example, the load characteristics increase steadily according to a certain period), a Prophet model may be established for the prediction of the load trend.

TABLE 2

Mapping table of the load characteristics and the prediction models

| Group | Periodic characteristic | Trend characteristic | Other characteristics | Factor that may be considered | Modeling algorithm |
|---|---|---|---|---|---|
| Target cell 1 (Target Cell Group 1) | Yes | No | ... | Historical load information | Holt-Winters model |
| Target cell 2 (Target Cell Group 2) | Yes | Yes | ... | Historical load information and historical weather | Prophet model |
| Target cell 3 (Target Cell Group 3) | No | Yes | ... | Historical load information, load information of N neighbor cells, and historical weather | Long short-term memory (LSTM) model |
| ... | ... | ... | ... | ... | ... |

In S250, the load trend of the target cell is predicted through the machine learning prediction model.

In this embodiment, load factor values of the target cell at different time points in a future period of time are predicted through the machine learning prediction model, the amount of loads is predicted according to the load factor values, and it is determined, according to the amount of loads, whether the energy saving may be started.

In S260, an energy-saving strategy of the target cell and effective time corresponding to the energy-saving strategy are determined according to the load trend.

In this embodiment, an executable energy-saving strategy and corresponding effective time are determined according to the predicted load trend. For example, if a load factor value is less than a first threshold in a future time period, an appropriate energy-saving strategy with relatively low energy consumption may be determined, and this time period is used as effective time corresponding to the energy-saving strategy; if a load factor value is greater than the first threshold but less than a second threshold in a future time period, another energy-saving strategy with relatively high energy consumption may be determined, and this time period is used as effective time corresponding to the energy-saving strategy; and if a load factor value is greater than the second threshold in a future time period, no energy-saving strategy is adopted, so as to satisfy relatively high service requirements or the like.

In S270, it is determined whether the deviation between load information of the target cell at a respective moment and the load trend is greater than or equal to a set threshold. If the deviation is greater than or equal to the set threshold, S280 is performed; and if the deviation is less than the set threshold, S290 is performed.

In S280, the load trend is updated according to the load information at the respective moment, and then return to S260, and the energy-saving strategy and the corresponding effective time are determined again according to the updated load trend.

In S290, the energy-saving strategy is executed according to the effective time.

In this embodiment, the deviation between the predicted load trend and the actual load information is compared in real time to determine whether the prediction and the decision-making need to be performed again. If the predicted load trend substantially conforms to the actual load information of the target cell in this time period, the determined energy-saving strategy may be executed according to the determined effective time. If the deviation between the predicted load trend and the actual load information of the target cell in this time period is relatively great, it is indicated that a load distribution has varied, so the energy-consumption influencing factor data at the current moment may be updated in real time. In this case, the prediction model may be updated based on new data information, and the prediction and the decision-making are performed again.

After the prediction model is obtained, load trends of multiple time granularities in the future may be predicted according to historical energy-consumption influencing factor data or real-time energy-consumption influencing factor data. For example, for a network system having a very high requirement for real-time performance such as a centralized system or a base station side that has low latency and data services including an ultra-reliable low-latency communication (URLLC) service and an enhanced mobile broadband (eMBB) service and needs to perform a control with a symbol shutdown energy-saving strategy at a millisecond level, a real-time prediction method may be adopted, that is, the load trend in the future is predicted according to the energy-consumption influencing factor data obtained in real time or the historical energy-consumption influencing factor data, and a load trend in a relatively short period of time may be predicted so that update frequencies of the prediction and the decision-making are improved and the requirement for the real-time performance is satisfied; and for a system having no relatively high requirement for the real-time performance such as a centralized system or a base station side that has certain latency, a load trend in a relatively long period of time in the future may be predicted according to the historical energy-consumption influencing factor data, so as to save computing amount on the premise that a low requirement for the real-time performance is satisfied.

In an embodiment, S240 includes at least one of: in the case where the load characteristic has periodicity and no trend, the machine learning prediction model is established through a smoothing algorithm; in the case where the load characteristic has periodicity and a trend, the machine learning prediction model is established through a time series algorithm; or in the case where the load characteristic has no periodicity, the machine learning prediction model is established through a regression modeling algorithm.

In this embodiment, different machine learning algorithms are adopted according to extracted different load characteristics to make models. Table 3 is a mapping table of the load characteristics and the machine learning algorithms for the modeling. As shown in Table 3, if the target cell has the periodic characteristics and the trend characteristics as the load characteristics, the model may be made with the time series algorithm such as an autoregressive integrated moving average (ARIMA) algorithm or a Prophet algorithm.

TABLE 3

Mapping table of the load characteristics and the machine learning algorithms for the modeling

| Load characteristic | Modeling algorithm |
| --- | --- |
| Periodic and having no trend | Smoothing algorithm such as a Holt-Winters algorithm |
| Periodic and having a trend | Time series algorithm such as the ARIMA algorithm or the Prophet algorithm |
| Aperiodic and having a trend | Regression modeling algorithm such as an LSTM algorithm and a support-vector machine (SVM) algorithm |
| Aperiodic and having no trend | Regression modeling algorithm such as the LSTM algorithm and the SVM algorithm |

In this embodiment, for load characteristics having significant periodic characteristics and/or significant trend characteristics, it is relatively easy to perform the prediction in a relatively accurate manner, and therefore a machine learning algorithm for relatively simple computing may be adopted to improve operation efficiency; but for load characteristics having no significant periodic characteristic and/or no significant trend characteristic, it is relatively difficult to perform the prediction, and therefore a machine learning algorithm with relatively high prediction accuracy may be adopted to achieve a better balance between prediction accuracy and the operation efficiency.

In an embodiment, S250 includes that load factor values corresponding to the target cell at multiple moments are predicted through the machine learning prediction model according to a set time granularity.

In this embodiment, the collected energy-consumption influencing factor data corresponds to a first time period and a first time granularity, for example, energy-consumption influencing factor data is collected every 15 minutes within six months; and the predicted load trend corresponds to a second time period and a second time granularity, for example, a load factor value per hour in a future week may be predicted through the prediction model.

In an embodiment, in S260, the load trend includes the load factor values corresponding to the target cell at the multiple moments. S260 includes S261 and S262.

In S261, a load factor value corresponding to each moment in the load trend is compared with a respective energy-saving threshold.

In S262, if the load factor value of the each moment is less than or equal to the respective energy-saving threshold, the energy-saving strategy of the target cell is determined and the each moment is used as the effective time corresponding to the energy-saving strategy.

In this embodiment, a most appropriate energy-saving strategy and most appropriate effective time are selected according to the predicted load trend. Values of each type of load factors in the load trend are compared with preset energy-saving thresholds. If the value of a load factor in a future time period is less than a preset energy-saving threshold, it is considered that this factor in this time period satisfies an energy-saving condition and the energy saving may be started; and if the value of the load factor in this time period in the future is greater than or equal to the preset energy-saving threshold, it is considered that the factor in this time period does not satisfy the energy-saving condition and the energy saving is not started. An energy-saving threshold corresponding to each moment or each time granularity may be different. For example, a load factor value is predicted for every 15 minutes the next day. At night (for example, from 0:00 to 06:00 in the morning), a network load is generally low and a corresponding energy-saving threshold is also low. In the evening (for example, from 18:00 to 21:00), the network load is generally high and a corresponding energy-saving threshold is also high. Thus, energy consumption is properly controlled, and the energy-saving strategy is flexibly determined.

In an embodiment, S260 includes that the energy-saving strategy of the target cell and the effective time corresponding to the energy-saving strategy are determined according to a discrete degree of time and a fluctuation degree of multiple load factor values in the load trend that are less than or equal to respective energy-saving thresholds.

In this embodiment, the adopted energy-saving strategy is related to the discrete degree of time and the fluctuation degree of the multiple load factor values (that are load factor values with relatively low load degrees) in the load trend that satisfy the energy-saving condition. A user rate is used as an example. In the cases where the user rate is relatively low and continuously stable in a certain range within one hour, the user rate is relatively low but has a relatively large fluctuation within one hour, and the user rate is relatively low within only 10 minutes in the morning and 10 minutes in the evening in one day (that is, the multiple load factor values that satisfy the energy-saving condition have a relatively high discrete degree), different energy-saving strategies are adopted, and the different energy-saving strategies have different response speeds, different energy-saving gains, and the like. Thus, targeted open sensing is performed for different actual network situations, thereby improving the applicability of energy-saving control.

In an embodiment, S260 includes that in the case where multiple consecutive load factor values each less than or equal to respective energy-saving thresholds exist in the load trend and a fluctuation degree of the multiple load factor values is smaller than or equal to a set degree, a first energy-saving strategy is adopted; in the case where multiple consecutive load factor values less than or equal to respective energy-saving thresholds do not exist in the load trend, a second energy-saving strategy is adopted; and in the case where multiple consecutive load factor values less than or equal to energy-saving thresholds exist in the load trend and a fluctuation degree of the multiple load factor values is larger than a set degree, a third energy-saving strategy is adopted; where an energy-saving response speed of the first energy-saving strategy is lower than an energy-saving response speed of the second energy-saving strategy; an energy-saving gain of the first energy-saving strategy is higher than an energy-saving gain of the second energy-saving strategy; and the third energy-saving strategy is a combination strategy of the first energy-saving strategy and the second energy-saving strategy.

In this embodiment, the different energy-saving strategies may be determined and executed for different predicted load trends. For example, for a time period in which the energy-saving condition is continuously satisfied for a long time (the load factor value is lower than the respective energy-saving threshold) and a load is low and stable, a strategy (for example, deep sleep) may be adopted that has a slow energy-saving response and a higher energy-saving gain; for a time period in which time points satisfying the energy-saving condition are distributed discretely and continuous time is extremely short, an energy-saving strategy (for example, symbol shutdown) may be adopted that has a fast energy-saving response, or even no energy-saving strategy may be adopted; and for a time period in which the energy-saving condition is continuously satisfied for a long time and a load is low but has a certain fluctuation, a combination strategy (for example, carrier shutdown+channel shutdown+symbol shutdown) may be adopted.

Table 4 is a mapping table of energy-saving strategies and effective time. As shown in Table 4, for the different predicted load trends, it may be determined that the different energy-saving strategies are executed in different time periods.

TABLE 4

Mapping table of the energy-saving strategies and the effective time

| Group | Effective time | Energy-saving strategy |
| --- | --- | --- |
| Target cell 1 (Target Cell Group 1) | 00:00-9:00 | Deep sleep |
| | 12:00-13:45 | Carrier shutdown + channel shutdown + symbol shutdown |
| | 16:00-17:00 | Carrier shutdown + channel shutdown + symbol shutdown |
| | 20:00-24:00 | Deep sleep |
| Target cell 2 (Target Cell Group 2) | 00:00-6:00 | Deep sleep |
| | 6:00-8:00 | Carrier shutdown + channel shutdown + symbol shutdown |
| | 10:00-15:00 | Carrier shutdown + channel shutdown + symbol shutdown |
| | 20:00-24:00 | Carrier shutdown + channel shutdown + symbol shutdown |
| Target cell 3 (Target Cell Group 3) | 00:00-6:00 | Deep sleep |
| | 6:00-24:00 | Symbol shutdown |

In an embodiment, S110 or S210 includes that key performance indicator (KPI) information of the neighbor cell is acquired through a core network device or a communication interface between the base station and an adjacent base station.

In this embodiment, in the case where the base station needs to acquire load information of the neighbor cell, if the neighbor cell is in the coverage range of the base station, the base station may directly acquire data of the neighbor cell. However, if the neighbor cell is outside the coverage range of the base station, a distributed network architecture is used as an example, the base station may perform the interaction of the load information through the core network device or a communication interface between the base station and another base station such that the load information of the neighbor cell is acquired, and in the case where service handover exists, the load information of the target cell is updated or adjusted according to the load information of the neighbor cell. For a centralized network architecture, multiple base stations may report their own key performance indicator information to a control unit for the control unit to perform the prediction and the decision-making.

Figure 3:
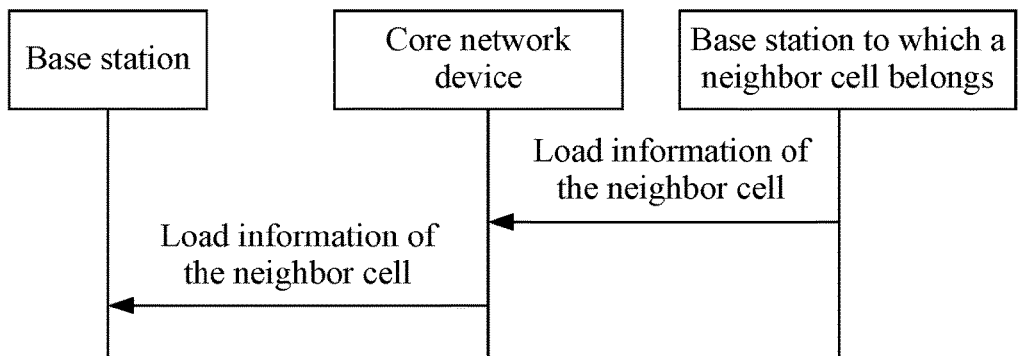
FIG. 3 is a schematic diagram illustrating acquisition of load information of a neighbor cell according to an embodiment.

FIG. 3 is a schematic diagram illustrating acquisition of load information of a neighbor cell according to an embodiment. As shown in FIG. 3, the base station to which the target cell belongs may acquire, through the core network device, the load information of the neighbor cell sent from the base station to which the neighbor cell belongs.

Figure 4:
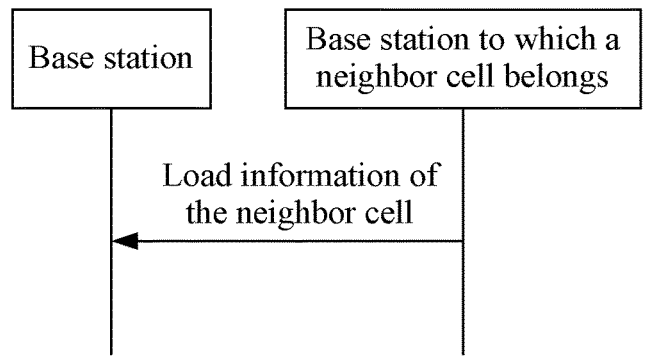
FIG. 4 is a schematic diagram illustrating acquisition of load information of a neighbor cell according to another embodiment.

FIG. 4 is a schematic diagram illustrating acquisition of load information of a neighbor cell according to another embodiment. As shown in FIG. 4, the base station to which the target cell belongs may directly acquire, through a communication interface between the base station and the base station to which the neighbor cell belongs, the load information of the neighbor cell sent from the base station to which the neighbor cell belongs.

In some embodiments, for example, in the centralized network architecture, a centralized control unit may also collect key performance indicator (KPI) information reported by each base station under the control unit such that the load information of the target cell and the load information of the neighbor cell are obtained.

The distributed network architecture is used as an example, and the process in which the energy-saving strategy is determined is described below with an example.

In the distributed network architecture, the base station performs the data collection, the load prediction, and the decision-making and execution of the energy-saving strategy on multiple target cells under the jurisdiction of the base station so that the energy-saving efficiency of each target cell is improved. In total, N target cells exist in the coverage range of the base station, which are denoted by Cell i, where the value of i is 1 to N, and N is a positive integer greater than or equal to 1.

(1) The base station collects the energy-consumption influencing factor data and may determine the load factors that need to be predicted. For example, the energy-consumption influencing factor data includes a variety of load information, the cell network planning information, and the information about the non-network factor in the preceding embodiment. The energy-consumption influencing factor data of last seven days is collected, and a corresponding time granularity is 15 minutes.

In the collection process, order may also be determined according to the distance and the number of times of service handover such that the neighbor cells are determined. In addition, load information of the neighbor cells is acquired through a core network or the communication interface (an X2 interface or an S1 interface) with another base station, where the load information of the neighbor cells includes indexes of the neighbor cells, load values of the neighbor cells, statistical data of the number of times of service handover of the neighbor cells, and the like. Based on KPI data corresponding to the neighbor cells, the target cell and the multiple neighbor cells of the target cell are traversed, the number of times of handover service (including the number of times of handover to the neighbor cell and the number of times of handover from the neighbor cell) between the target cell and each neighbor cell is calculated separately, the multiple neighbor cells are ranked in descending order according to the number of times of service handover, and M cells ranked first are selected as the neighbor cells. For the neighbor cells in the base station, the base station may obtain the KPI information directly; and for the neighbor cells outside the base station, the base station needs to acquire the load information of the corresponding cells through the information interaction.

(2) The base station predicts the load trend according to the energy-consumption influencing factor data. The energy-consumption influencing factor data is coded and the load attributes are extracted, where the load attributes mainly refer to the time series characteristic that includes the periodic characteristic, the trend characteristic, and the like.

The different prediction algorithms are adopted for the modeling. The target cell group may also be obtained through the division, and the uniform prediction and decision-making are performed on the target cell group.

(3) The base station obtains the load trend in the future period of time according to a prediction by the prediction model, where the load trend includes multiple load factor values at different moments. For example, the load factor value is predicted for every 15 minutes the next day. If the prediction time period is shorter and the time granularity is smaller, a more real-time and accurate prediction effect can be achieved.

(4) The base station respectively compares the predicted load factor values at the different moments with the corresponding energy-saving thresholds such that the most appropriate energy-saving strategy is selected and the effective time is determined.

When the deviation between an actual network load and the predicted result is relatively large, the base station may update the prediction model according to real-time data, predict the load trend again, and determine anew energy-saving strategy and new effective time.

According to the energy-saving method in the preceding embodiment, different energy-consumption influencing factor data is considered synthetically, and the load factor values at the different time points in the future are predicted based on the historical energy-consumption influencing factor data and/or the real-time energy-consumption influencing factor data so that the comprehensiveness and accuracy of the prediction are improved, energy-saving efficiency is improved, and the energy consumption of the base station is reduced; the different machine learning algorithms are adopted according to the load characteristics to establish different prediction models so that the balance between prediction efficiency and the prediction accuracy is achieved; the deviation between the predicted result and the actual network load is compared to update the model and the predicted result and the prediction is performed in conjunction with the historical data and the real-time data so that the prediction accuracy is improved; and different energy-saving thresholds are set and the most appropriate energy-saving strategy is selected and prediction time and a prediction frequency are adjusted according to a variation degree of the load so that decisions may be made dynamically according to the variation of the load, the diversity and flexibility of the energy-saving control are improved, and the energy-saving strategy and the effective time are determined according to an actual network situation to reduce the energy consumption in a targeted and efficient manner.

In embodiments of the present application, an energy-saving method applied to a control unit is further provided. The control unit refers to a network management device, an MEC data platform, a network element, a centralized management server, or the like in a centralized network architecture. The control unit predicts a load trend of a target cell according to energy-consumption influencing factor data, determines an executable energy-saving strategy and effective time of the strategy according to the predicted load trend, and indicates the energy-saving strategy and the effective time to a base station, and the base station executes the energy-saving strategy. According to the method, an actual situation in a network environment is considered and the base station can be controlled flexibly to execute a respective energy-saving strategy at specific effective time so that the energy consumption of the base station is effectively reduced.

Figure 5:
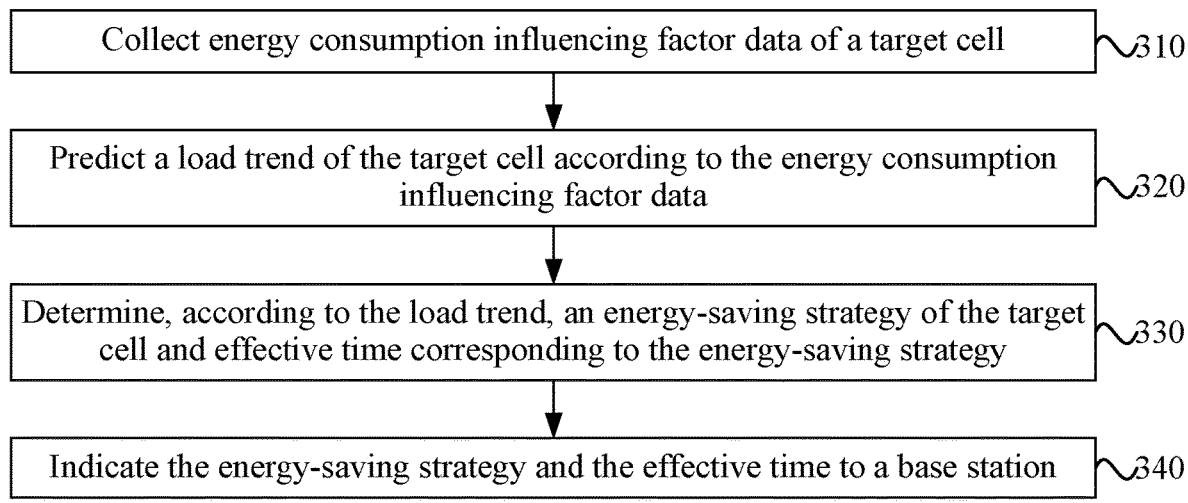
FIG. 5 is a flowchart of an energy-saving method applied to a control unit according to an embodiment.

FIG. 5 is a flowchart of an energy-saving method applied to a control unit according to an embodiment. As shown in FIG. 5, the method includes S310 to S340.

In S310, energy-consumption influencing factor data of a target cell is collected.

In S320, a load trend of the target cell is predicted according to the energy-consumption influencing factor data.

In S330, an energy-saving strategy of the target cell and effective time corresponding to the energy-saving strategy are determined according to the load trend.

In S340, the energy-saving strategy and the effective time are indicated to a base station.

The energy-saving method of this embodiment is applicable to an application scenario of the centralized network architecture. The collection of the energy-consumption influencing factor data, the prediction of the load trend, and the decision-making on the energy-saving strategy and the effective time are all implemented through a centralized control unit.

Figure 6:
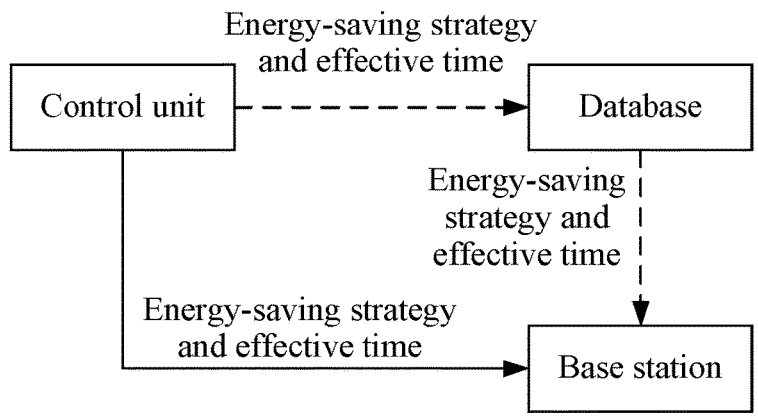
FIG. 6 is a schematic diagram illustrating implementation of an energy-saving method according to an embodiment.

FIG. 6 is a schematic diagram illustrating implementation of an energy-saving method according to an embodiment. As shown in FIG. 6, the control unit may directly send the energy-saving strategy and the effective time to the base station according to a certain strategy and a certain time granularity (as shown by the solid line in FIG. 6). The control unit may also first store the energy-saving strategy and the effective time in a database. The base station may read a latest energy-saving strategy and latest effective time from the database (as shown by the dashed lines in FIG. 6). The base station executes the energy-saving strategy according to the read information, which reduces a workload of the base station to a certain extent and improves the execution efficiency in the determination of the energy-saving strategy.

In an embodiment, the energy-consumption influencing factor data includes at least one of: load information of the target cell, load information of a neighbor cell, or information about a non-network factor, where the load information of the neighbor cell includes load information generated by service handover between the target cell and the neighbor cell.

In an embodiment, the method further includes S310 in which cells in a coverage range are ranked according to the number of times of service handover performed between the target cell and each of the cells or the distance between the target cell and each of the cells and the set number of cells ranked first are determined as neighbor cells.

In an embodiment, S320 includes S321 to S324.

In S321, the energy-consumption influencing factor data is coded such that the coded data is obtained.

In S322, a load characteristic of the target cell is extracted according to the coded data.

In 323, a machine learning prediction model is established according to the load characteristic.

In S324, the load trend of the target cell is predicted through the machine learning prediction model.

In an embodiment, S323 includes at least one of: in the case where the load characteristic has periodicity and no trend, the machine learning prediction model is established through a smoothing algorithm; in the case where the load characteristic has periodicity and a trend, the machine learning prediction model is established through a time series algorithm; or in the case where the load characteristic has no periodicity, the machine learning prediction model is established through a regression modeling algorithm.

In an embodiment, S324 includes that load factor values corresponding to the target cell at multiple moments are predicted through the machine learning prediction model according to a set time granularity.

In an embodiment, S322 includes that in the case where at least two target cells exist, a centroid of a clustering algorithm corresponding to the multiple target cells is used as the load characteristic, or the mean or median of the energy-consumption influencing factor data of the multiple target cells is used as the load characteristic.

In an embodiment, the method further includes S350 in which if the deviation between the load trend and load information of the target cell at a respective moment is greater than or equal to a set threshold, the load trend is updated according to the load information at the respective moment.

In an embodiment, the load trend includes the load factor values corresponding to the target cell at the multiple moments. S330 includes that a load factor value corresponding to each moment in the load trend is compared with a respective energy-saving threshold; and if the load factor value of the each moment is less than or equal to the respective energy-saving threshold, the energy-saving strategy of the target cell is determined and the each moment is used as the effective time corresponding to the energy-saving strategy.

In an embodiment, S330 includes that the energy-saving strategy of the target cell and the effective time corresponding to the energy-saving strategy are determined according to a discrete degree of time and a fluctuation degree of multiple load factor values in the load trend that are less than or equal to respective energy-saving thresholds.

In an embodiment, S330 includes that in the case where multiple consecutive load factor values each less than or equal to respective energy-saving thresholds exist in the load trend and a fluctuation degree of the multiple load factor values is smaller than or equal to a set degree, a first energy-saving strategy is adopted; in the case where multiple consecutive load factor values less than or equal to respective energy-saving thresholds do not exist in the load trend, a second energy-saving strategy is adopted; and in the case where multiple consecutive load factor values less than or equal to energy-saving thresholds exist in the load trend and a fluctuation degree of the multiple load factor values is larger than a set degree, a third energy-saving strategy is adopted; where an energy-saving response speed of the first energy-saving strategy is lower than an energy-saving response speed of the second energy-saving strategy; an energy-saving gain of the first energy-saving strategy is higher than an energy-saving gain of the second energy-saving strategy; and the third energy-saving strategy is a combination strategy of the first energy-saving strategy and the second energy-saving strategy.

In an embodiment, the method further includes S302 in which time to predict the load trend and/or a period to predict the load trend are determined according to a variation frequency of the load information of the target cell and a variation amplitude of the load information of the target cell.

In an embodiment, the method further includes S303 in which the target cell is divided according to a time characteristic of the energy-consumption influencing factor data, where the target cell includes at least one cell.

In an embodiment, S310 includes that key performance indicator information reported by the base station is received and the energy-consumption influencing factor data is determined according to the key performance indicator information.

In this embodiment, the centralized control unit may acquire the load information of the target cell by receiving a KPI reported by the base station to which the target cell belongs, and the centralized control unit may also acquire the load information of the neighbor cell by receiving a KPI reported by the base station to which the neighbor cell belongs. A synthetic prediction and uniform decision-making are performed according to the KPIs reported by the multiple base stations, so as to uniformly plan and manage network resources, thereby implementing energy-saving control of the multiple base stations.

In this embodiment, the collection of the energy-consumption influencing factor data, the prediction of the load trend, and the decision-making on the energy-saving strategy and the effective time are all executed by the control unit. The solution in the preceding embodiment is also applicable in this embodiment that the load trend of the target cell is predicted according to the energy-consumption influencing factor data and the respective energy-saving strategy and the respective effective time for the target cell are determined. An execution manner of the control unit may be implemented in the manner described in any of the preceding embodiments. For technical details not described in detail in this embodiment, reference may be made to any of the preceding embodiments.

The centralized network architecture is used as an example, and the process in which the energy-saving strategy is determined is described below with an example.

In the centralized network architecture, the control unit performs the data collection, the load prediction, and the decision-making on the energy-saving strategy on multiple target cells under the jurisdiction of the control unit, and the energy-saving strategy is executed by multiple base stations separately. In total, N target cells exist in the coverage range of a base station where energy-saving management needs to be performed currently, which are denoted by Cell i, where the value of i is 1 to N, and N is a positive integer greater than or equal to 1.

(1) The control unit collects the energy-consumption influencing factor data and may determine the load factors that need to be predicted. For example, the energy-consumption influencing factor data includes a variety of load information, the cell network planning information, and the information about the non-network factor in the preceding embodiment. The energy-consumption influencing factor data of last seven days is collected, and a time granularity is 15 minutes.

In the collection process, order may also be determined according to the distance and the number of times of service handover such that the neighbor cells are determined. In addition, load information of the neighbor cells is acquired through a core network or a communication interface (an X2 interface or an S1 interface) with another base station, where the load information of the neighbor cells includes indexes of the neighbor cells, load values of the neighbor cells, statistical data of the number of times of service handover of the neighbor cells, and the like. Based on KPI data corresponding to the neighbor cells, the target cell and the multiple neighbor cells of the target cell are traversed, the number of times of handover service (including the number of times of handover to the neighbor cell and the number of times of handover from the neighbor cell) between the target cell and each neighbor cell is calculated separately, the multiple neighbor cells are ranked in descending order according to the number of times of service handover, and M cells ranked first are selected as the neighbor cells. For neighbor cells in the base station, the KPI information may be obtained directly; and for neighbor cells outside the base station, the load information of the corresponding cells needs to be acquired through an information interaction.

(2) The control unit predicts the load trend according to the energy-consumption influencing factor data. The energy-consumption influencing factor data is coded and load attributes are extracted, where the load attributes mainly refer to a time series characteristic that includes a periodic characteristic, a trend characteristic, and the like. Different prediction algorithms are adopted for modeling. The control unit may also obtain a target cell group through division, and the uniform prediction and decision-making are performed on the target cell group.

(3) The control unit obtains the load trend in a future period of time according to a prediction by the prediction model, where the load trend includes multiple load factor values at different moments. For example, the load factor value is predicted for every 15 minutes the next day. If the prediction time period is shorter and the time granularity is smaller, a more real-time and accurate prediction effect can be achieved.

(4) The control unit respectively compares the predicted load factor values at the different moments with the corresponding energy-saving thresholds to select a most appropriate energy-saving strategy and determine the effective time and indicates the energy-saving strategy and the effective time to the base station. The base station executes the energy-saving strategy.

When the deviation between an actual load of a network and the predicted result is relatively large, the control unit may update the prediction model according to real-time data, predict the load trend again, and determine anew energy-saving strategy and new effective time.

In embodiments of the present application, an energy-saving method applied to a base station is further provided, where the base station receives an energy-saving strategy and effective time that are indicated by a control unit and executes the energy-saving strategy according to effective time. The method is applicable to actual situations in different network environments so that the energy-saving strategy is flexibly adjusted, energy-saving flexibility is improved, and energy consumption is reduced.

Figure 7:
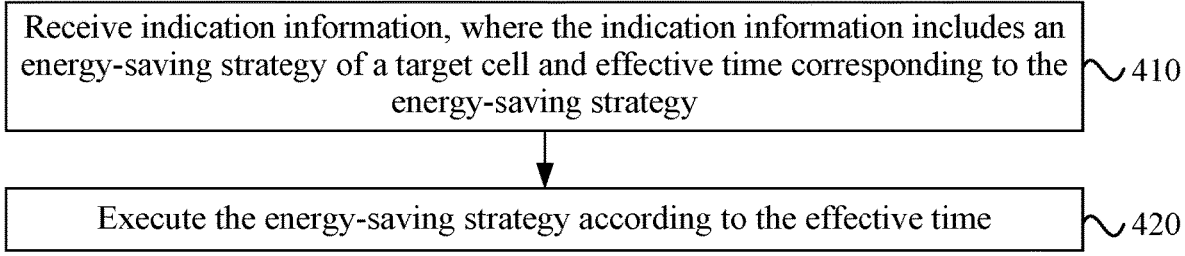
FIG. 7 is a flowchart of an energy-saving method applied to a base station according to another embodiment.

FIG. 7 is a flowchart of another energy-saving method applied to a base station according to an embodiment. As shown in FIG. 7, the method includes S410 and S420.

In S410, indication information is received, where the indication information includes an energy-saving strategy of a target cell and effective time corresponding to the energy-saving strategy.

In S420, the energy-saving strategy is executed according to the effective time.

The energy-saving method of this embodiment is applicable to an application scenario of a centralized network architecture. The collection of energy-consumption influencing factor data, the prediction of a load trend, and the decision-making on the energy-saving strategy and the effective time are all implemented through a centralized control unit. The base station is responsible for executing the energy-saving strategy. For an implementation process, reference may be made to FIG. 6.

In an embodiment, the method further includes S430 in which key performance indicator information is reported to the control unit, where the key performance indicator information includes the energy-consumption influencing factor data.

In this embodiment, the collection of the energy-consumption influencing factor data, the prediction of the load trend, and the decision-making on the energy-saving strategy and the effective time are all executed by the control unit. The solution in the preceding embodiment is also applicable in this embodiment that the load trend of the target cell is predicted according to the energy-consumption influencing factor data and the respective energy-saving strategy and the respective effective time are determined. An execution manner of the control unit may be implemented in the manner described in any of the preceding embodiments. For the base station, the solution in the preceding embodiment is also applicable in this embodiment that different energy-saving strategies are executed at different effective time. An execution manner of the base station may be implemented in the manner described in any of the preceding embodiments. For technical details not described in this embodiment, reference may be made to any of the preceding embodiments.

In embodiments of the present application, an energy-saving method applied to a control unit is further provided. The control unit refers to a network management device, an MEC data platform, a network element, a centralized management server, or the like in a centralized network architecture. The control unit predicts a load trend of a target cell according to energy-consumption influencing factor data and indicates the predicted load trend to a base station, and the base station determines an energy-saving strategy and effective time and executes the energy-saving strategy. According to the method, an actual situation in a network environment is considered and the base station can be controlled flexibly to execute a respective energy-saving strategy at specific effective time so that the energy consumption of the base station is effectively reduced.

Figure 8:
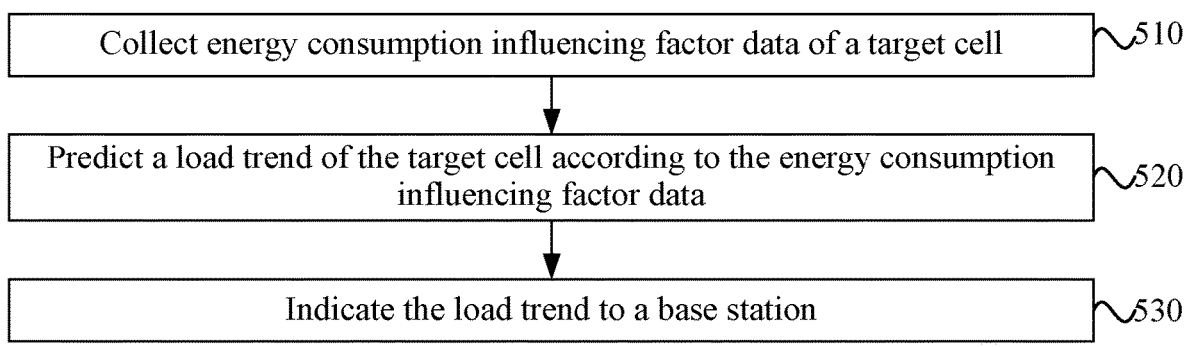
FIG. 8 is a flowchart of an energy-saving method applied to a control unit according to another embodiment.

FIG. 8 is a flowchart of an energy-saving method applied to a control unit according to another embodiment. As shown in FIG. 8, the method includes S510 to S530.

In S510, energy-consumption influencing factor data of a target cell is collected.

In S520, a load trend of the target cell is predicted according to the energy-consumption influencing factor data.

In S530, the load trend is indicated to the base station.

The energy-saving method of this embodiment is applicable to an application scenario of the centralized network architecture. The collection of the energy-consumption influencing factor data and the prediction of the load trend are both executed through a centralized control unit. The control unit sends indication information of the load trend to the base station, and the base station performs the decision-making on the energy-saving strategy and the effective time and executes the energy-saving strategy.

Figure 9:
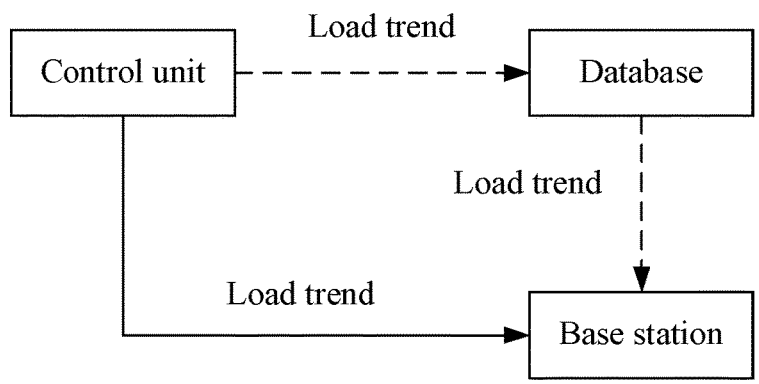
FIG. 9 is a schematic diagram illustrating implementation of an energy-saving method according to another embodiment.

FIG. 9 is a schematic diagram illustrating implementation of an energy-saving method according to another embodiment. As shown in FIG. 9, the control unit may directly send the predicted load trend to the base station according to a certain strategy and a certain time granularity (as shown by the solid lines in FIG. 9). The control unit may also first store the load trend in a database. The base station may read a latest load trend from the database (as shown by the dashed lines in FIG. 9). The base station determines the energy-saving strategy and the effective time according to the read load trend (as shown by the dashed lines in FIG. 9) and then executes the energy-saving strategy, which improves the execution efficiency in the determination of the energy-saving strategy.

In an embodiment, S510 includes that key performance indicator information reported by the base station is received and the energy-consumption influencing factor data is determined according to the key performance indicator information.

In this embodiment, the centralized control unit may acquire load information of the target cell by receiving a KPI of the target cell reported by the base station to which the target cell belongs, and the centralized control unit may also acquire load information of a neighbor cell through a KPI of the neighbor cell reported by the base station to which the neighbor cell belongs. A synthetic prediction and uniform decision-making are performed according to the KPIs reported by the multiple base stations, so as to uniformly plan and manage network resources, thereby implementing energy-saving control of the multiple base stations.

In this embodiment, the collection of the energy-consumption influencing factor data and the prediction of the load trend are both executed by the control unit. The solution in the preceding embodiment is also applicable in this embodiment that the load trend of the cell is predicted according to the energy-consumption influencing factor data. An execution manner of the control unit may be implemented in the manner described in any of the preceding embodiments. For technical details not described in this embodiment, reference may be made to any of the preceding embodiments.

In embodiments of the present application, an energy-saving method applied to a base station is further provided, where the base station receives a load trend indicated by a control unit, determines an energy-saving strategy of a target cell and effective time of the target cell according to the load trench, and executes the energy-saving strategy according to the effective time. The method is applicable to actual situations in different network environments so that the energy-saving strategy is flexibly adjusted, energy-saving flexibility is improved, and energy consumption is reduced.

Figure 10:
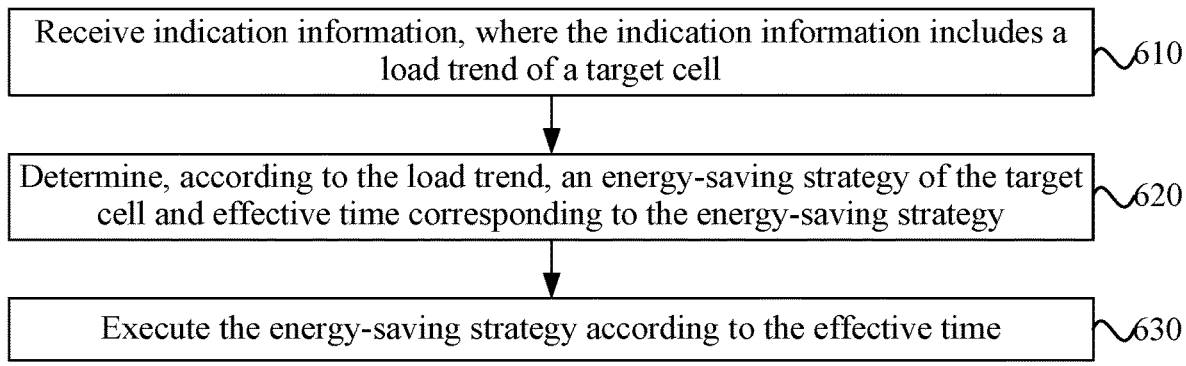
FIG. 10 is a flowchart of an energy-saving method applied to a base station according to another embodiment.

FIG. 10 is a flowchart of an energy-saving method applied to a base station according to another embodiment. As shown in FIG. 10, the method includes S610 to S630.

In S610, indication information is received, where the indication information includes a load trend of a target cell.

In S620, an energy-saving strategy of the target cell and effective time corresponding to the energy-saving strategy are determined according to the load trend.

In S630, the energy-saving strategy is executed according to the effective time.

The energy-saving method of this embodiment is applicable to an application scenario of a centralized network architecture. The collection of energy-consumption influencing factor data and the prediction of the load trend are both implemented through a centralized control unit. The base station may determine the energy-saving strategy and the effective time according to the indication from the control unit and executes the energy-saving strategy. For an implementation process, reference may be made to FIG. 9.

In an embodiment, the method further includes S640 in which key performance indicator information is reported to the control unit, where the key performance indicator information includes the energy-consumption influencing factor data.

In this embodiment, the collection of the energy-consumption influencing factor data and the prediction of the load trend are both executed by the control unit. The solution in the preceding embodiment is also applicable in this embodiment that the load trend of the cell is predicted according to the energy-consumption influencing factor data. An execution manner of the control unit may be implemented in the manner described in any of the preceding embodiments. For the base station, the solution in the preceding embodiment is also applicable in this embodiment that the energy-saving strategy and the effective time are determined according to the load trend and different energy-saving strategies are executed at different effective time. An execution manner of the base station may be implemented in the manner described in any of the preceding embodiments. For technical details not described in this embodiment, reference may be made to any of the preceding embodiments.

Figure 11:
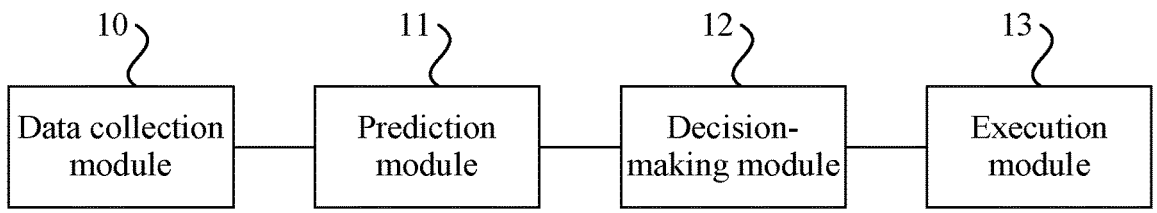
FIG. 11 is a structural diagram of an energy-saving apparatus according to an embodiment.

Embodiments of the present application further provide an energy-saving apparatus. FIG. 11 is a structural diagram of an energy-saving apparatus according to an embodiment. As shown in FIG. 11, the energy-saving apparatus includes a data collection module 10, a prediction module 11, a decision-making module 12, and an execution module 13.

The data collection module 10 is configured to collect energy-consumption influencing factor data of a target cell.

The prediction module 11 is configured to predict a load trend of the target cell according to the energy-consumption influencing factor data.

The decision-making module 12 is configured to determine, according to the load trend, an energy-saving strategy of the target cell and effective time corresponding to the energy-saving strategy.

The execution module 13 is configured to execute the energy-saving strategy according to the effective time.

With the energy-saving apparatus of this embodiment, the load trend of the target cell is predicted according to the energy-consumption influencing factor data, and an executable energy-saving strategy and effective time of the strategy are determined according to the predicted load trend. With the apparatus, an actual situation in a network environment is considered and a respective energy-saving strategy can be flexibly executed at specific effective time so that the energy consumption of a base station is effectively reduced.

In an embodiment, the energy-consumption influencing factor data includes at least one of: load information of the target cell, load information of a neighbor cell, or information about a non-network factor, where the load information of the neighbor cell includes load information generated by service handover between the target cell and the neighbor cell.

In an embodiment, the apparatus further includes a neighbor cell determination module that is configured to rank cells in a coverage range according to the number of times of service handover performed between the target cell and each of the cells and/or the distance between the target cell and each of the cells and determine the set number of cells ranked first as neighbor cells.

In an embodiment, the prediction module 12 includes a coding unit, a characteristic extraction unit, a modeling unit, and a prediction module. The coding unit is configured to code the energy-consumption influencing factor data such that the coded data is obtained. The characteristic extraction unit is configured to extract a load characteristic of the target cell according to the coded data. The modeling unit is configured to establish a machine learning prediction model according to the load characteristic. The prediction module is configured to predict the load trend of the target cell through the machine learning prediction model.

In an embodiment, the modeling unit is configured to perform at least one of the following operations: in the case where the load characteristic has periodicity and no trend, the machine learning prediction model is established through a smoothing algorithm; in the case where the load characteristic has periodicity and a trend, the machine learning prediction model is established through a time series algorithm; or in the case where the load characteristic has no periodicity, the machine learning prediction model is established through a regression modeling algorithm.

In an embodiment, the prediction unit is configured to predict, through the machine learning prediction model according to a set time granularity, load factor values corresponding to the target cell at multiple moments.

In an embodiment, the characteristic extraction unit is configured to, in the case where at least two target cells exist, use a centroid of a clustering algorithm corresponding to the multiple target cells as the load characteristic or use the mean or median of the energy-consumption influencing factor data of the multiple target cells as the load characteristic.

In an embodiment, the apparatus further includes an update module that is configured to, if the deviation between the load trend and load information of the target cell at a respective moment is greater than or equal to a set threshold, update the load trend according to the load information at the respective moment.

In an embodiment, the load trend includes the load factor values corresponding to the target cell at the multiple moments. The decision-making module 13 includes a comparison unit and a decision-making unit. The comparison unit is configured to compare a load factor value corresponding to each moment in the load trend with a respective energy-saving threshold. The decision-making unit is configured to, if the load factor value of the each moment is less than or equal to the respective energy-saving threshold, determine the energy-saving strategy of the target cell and use the each moment as the effective time corresponding to the energy-saving strategy.

In an embodiment, the decision-making module 13 is configured to determine, according to a discrete degree of time and a fluctuation degree of multiple load factor values in the load trend that are less than or equal to respective energy-saving thresholds, the energy-saving strategy of the target cell and the effective time corresponding to the energy-saving strategy.

In an embodiment, the decision-making module 13 is configured to: in the case where multiple consecutive load factor values each less than or equal to respective energy-saving thresholds exist in the load trend and a fluctuation degree of the multiple load factor values is smaller than or equal to a set degree, a first energy-saving strategy is adopted; in the case where multiple consecutive load factor values less than or equal to respective energy-saving thresholds do not exist in the load trend, a second energy-saving strategy is adopted; and in the case where multiple consecutive load factor values less than or equal to energy-saving thresholds exist in the load trend and a fluctuation degree of the multiple load factor values is larger than a set degree, a third energy-saving strategy is adopted; where an energy-saving response speed of the first energy-saving strategy is lower than an energy-saving response speed of the second energy-saving strategy; an energy-saving gain of the first energy-saving strategy is higher than an energy-saving gain of the second energy-saving strategy; and the third energy-saving strategy is a combination strategy of the first energy-saving strategy and the second energy-saving strategy.

In an embodiment, the data collection module 11 is configured to acquire key performance indicator information of the neighbor cell through a core network device or a communication interface with an adjacent base station.

In an embodiment, the apparatus further includes a prediction management module that is configured to determine, according to a variation frequency of the load information of the target cell and a variation amplitude of the load information of the target cell, time to predict the load trend and/or a period to predict the load trend.

In an embodiment, the apparatus further includes a grouping module that is configured to divide the target cell according to a time characteristic of the energy-consumption influencing factor data, where the target cell includes at least one cell.

The energy-saving apparatus provided in this embodiment and the energy-saving method applied to a base station provided in the preceding embodiments belong to the same concept. For technical details not described in this embodiment, reference may be made to any of the preceding embodiments.

Figure 12:
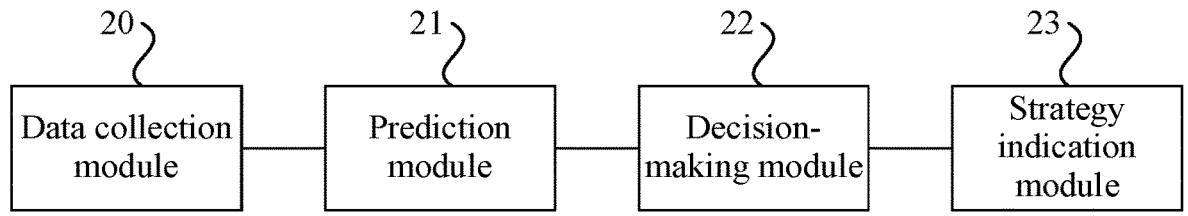
FIG. 12 is a structural diagram of an energy-saving apparatus according to another embodiment.

Embodiments of the present application further provide an energy-saving apparatus. FIG. 12 is a structural diagram of an energy-saving apparatus according to another embodiment. As shown in FIG. 12, the energy-saving apparatus includes a data collection module 20, a prediction module 21, a decision-making module 23 module 22, and a strategy indication module 23.

The data collection module 20 is configured to collect energy-consumption influencing factor data of a target cell.

The prediction module 21 is configured to predict a load trend of the target cell according to the energy-consumption influencing factor data.

The decision-making module 22 is configured to determine, according to the load trend, an energy-saving strategy of the target cell and effective time corresponding to the energy-saving strategy.

The strategy indication module 23 is configured to indicate the energy-saving strategy and the effective time to a base station.

With the energy-saving apparatus of this embodiment, the load trend of the target cell is predicted according to the energy-consumption influencing factor data, and an executable energy-saving strategy and effective time of the strategy are determined according to the predicted load trend and indicated to the base station. With the apparatus, an actual situation in a network environment is considered and the base station can be controlled flexibly to execute a respective energy-saving strategy at specific effective time so that the energy consumption of the base station is effectively reduced.

In an embodiment, the energy-consumption influencing factor data includes at least one of load information of the target cell, load information of a neighbor cell, or information about a non-network factor, where the load information of the neighbor cell includes load information generated by service handover between the target cell and the neighbor cell.

In an embodiment, the apparatus further includes a neighbor cell determination module that is configured to rank cells in a coverage range according to the number of times of service handover performed between the target cell and each of the cells and/or the distance between the target cell and each of the cells and determine the set number of cells ranked first as neighbor cells.

In an embodiment, the prediction module 21 includes a coding unit, a characteristic extraction unit, a modeling unit, and a prediction module. The coding unit is configured to code the energy-consumption influencing factor data such that the coded data is obtained. The characteristic extraction unit is configured to extract a load characteristic of the target cell according to the coded data. The modeling unit is configured to establish a machine learning prediction model according to the load characteristic. The prediction module is configured to predict the load trend of the target cell through the machine learning prediction model.

In an embodiment, the modeling unit is configured to perform at least one of the following operations: in the case where the load characteristic has periodicity and no trend, the machine learning prediction model is established through a smoothing algorithm; in the case where the load characteristic has periodicity and a trend, the machine learning prediction model is established through a time series algorithm; or in the case where the load characteristic has no periodicity, the machine learning prediction model is established through a regression modeling algorithm.

In an embodiment, the prediction unit is configured to predict, through the machine learning prediction model according to a set time granularity, load factor values corresponding to the target cell at multiple moments.

In an embodiment, the characteristic extraction unit is configured to, in the case where at least two target cells exist, use a centroid of a clustering algorithm corresponding to the multiple target cells as the load characteristic or use the mean or median of the energy-consumption influencing factor data of the multiple target cells as the load characteristic.

In an embodiment, the apparatus further includes an update module that is configured to, if the deviation between the load trend and load information of the target cell at a respective moment is greater than or equal to a set threshold, update the load trend according to the load information at the respective moment.

In an embodiment, the load trend includes the load factor values corresponding to the target cell at the multiple moments. The decision-making module 22 includes a comparison unit and a decision-making unit. The comparison unit is configured to compare a load factor value corresponding to each moment in the load trend with a respective energy-saving threshold. The decision-making unit is configured to, if the load factor value of the each moment is less than or equal to the respective energy-saving threshold, determine the energy-saving strategy of the target cell and use the each moment as the effective time corresponding to the energy-saving strategy.

In an embodiment, the decision-making module 22 is configured to determine, according to a discrete degree of time and a fluctuation degree of multiple load factor values in the load trend that are less than or equal to respective energy-saving thresholds, the energy-saving strategy of the target cell and the effective time corresponding to the energy-saving strategy.

In an embodiment, the decision-making module 13 is configured to: in the case where multiple consecutive load factor values each less than or equal to respective energy-saving thresholds exist in the load trend and a fluctuation degree of the multiple load factor values is smaller than or equal to a set degree, a first energy-saving strategy is adopted; in the case where multiple consecutive load factor values less than or equal to respective energy-saving thresholds do not exist in the load trend, a second energy-saving strategy is adopted; and in the case where multiple consecutive load factor values less than or equal to energy-saving thresholds exist in the load trend and a fluctuation degree of the multiple load factor values is larger than a set degree, a third energy-saving strategy is adopted; where an energy-saving response speed of the first energy-saving strategy is lower than an energy-saving response speed of the second energy-saving strategy; an energy-saving gain of the first energy-saving strategy is higher than an energy-saving gain of the second energy-saving strategy; and the third energy-saving strategy is a combination strategy of the first energy-saving strategy and the second energy-saving strategy.

In an embodiment, the data collection module 20 is configured to receive key performance indicator information reported by the base station and determine the energy-consumption influencing factor data according to the key performance indicator information.

In an embodiment, the apparatus further includes a prediction management module that is configured to determine, according to a variation frequency of the load information of the target cell and a variation amplitude of the load information of the target cell, time to predict the load trend and/or a period to predict the load trend.

In an embodiment, the apparatus further includes a grouping module that is configured to divide the target cell according to a time characteristic of the energy-consumption influencing factor data, where the target cell includes at least one cell.

The energy-saving apparatus provided in this embodiment and the energy-saving method applied to a control unit provided in the preceding embodiments belong to the same concept. For technical details not described in this embodiment, reference may be made to any of the preceding embodiments.

Figure 13:
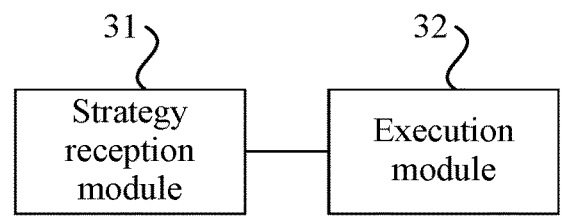
FIG. 13 is a structural diagram of an energy-saving apparatus according to another embodiment.

Embodiments of the present application further provide an energy-saving apparatus. FIG. 13 is a structural diagram of an energy-saving apparatus according to another embodiment. As shown in FIG. 13, the energy-saving apparatus includes a strategy reception module 31 and an execution module 32.

The strategy reception module 31 is configured to receive indication information, where the indication information includes an energy-saving strategy of a target cell and effective time corresponding to the energy-saving strategy.

The execution module 32 is configured to execute the energy-saving strategy according to the effective time.

With the energy-saving apparatus, the indication information is received and the energy-saving strategy is executed according to the effective time. The energy-saving apparatus is applicable to actual situations in different network environments so that the energy-saving strategy is flexibly adjusted, energy-saving flexibility is improved, and energy consumption is reduced.

In an embodiment, the apparatus further includes a reporting module that is configured to report key performance indicator information to a control unit, where the key performance indicator information includes energy-consumption influencing factor data.

The energy-saving apparatus provided in this embodiment and the energy-saving method applied to a base station provided in the preceding embodiments belong to the same concept. For technical details not described in this embodiment, reference may be made to any of the preceding embodiments.

Figure 14:
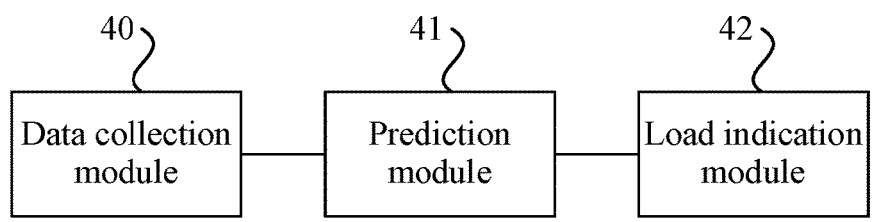
FIG. 14 is a structural diagram of an energy-saving apparatus according to another embodiment.

Embodiments of the present application further provide an energy-saving apparatus. FIG. 14 is a structural diagram of an energy-saving apparatus according to another embodiment. As shown in FIG. 14, the energy-saving apparatus includes a data collection module 41, a prediction module 42, and a load indication module 43.

The data collection module 41 is configured to collect energy-consumption influencing factor data of a target cell.

The prediction module 42 is configured to predict a load trend of the target cell according to the energy-consumption influencing factor data.

The load indication module 43 is configured to indicate the load trend to a base station.

With the energy-saving apparatus of this embodiment, the load trend of the target cell is predicted according to the energy-consumption influencing factor data, and the load trend is indicated to the base station for the base station to perform decision-making and execution. With the apparatus, an actual situation in a network environment is considered and the base station can be controlled flexibly to execute a respective energy-saving strategy at specific effective time so that the energy consumption of the base station is effectively reduced and a workload of the base station is reduced.

In an embodiment, the energy-consumption influencing factor data includes at least one of load information of the target cell, load information of a neighbor cell, or information about a non-network factor, where the load information of the neighbor cell includes load information generated by service handover between the target cell and the neighbor cell.

In an embodiment, the apparatus further includes a neighbor cell determination module that is configured to rank cells in a coverage range according to the number of times of service handover performed between the target cell and each of the cells and/or the distance between the target cell and each of the cells and determine the set number of cells ranked first as neighbor cells.

In an embodiment, the prediction module 42 includes a coding unit, a characteristic extraction unit, a modeling unit, and a prediction module. The coding unit is configured to code the energy-consumption influencing factor data such that the coded data is obtained. The characteristic extraction unit is configured to extract a load characteristic of the target cell according to the coded data. The modeling unit is configured to establish a machine learning prediction model according to the load characteristic. The prediction module is configured to predict the load trend of the target cell through the machine learning prediction model.

In an embodiment, the modeling unit is configured to perform at least one of the following operations: in the case where the load characteristic has periodicity and no trend, the machine learning prediction model is established through a smoothing algorithm; in the case where the load characteristic has periodicity and a trend, the machine learning prediction model is established through a time series algorithm; or in the case where the load characteristic has no periodicity, the machine learning prediction model is established through a regression modeling algorithm.

In an embodiment, the prediction unit is configured to predict, through the machine learning prediction model according to a set time granularity, load factor values corresponding to the target cell at multiple moments.

In an embodiment, the characteristic extraction unit is configured to, in the case where at least two target cells exist, use a centroid of a clustering algorithm corresponding to the multiple target cells as the load characteristic or use the mean or median of the energy-consumption influencing factor data of the multiple target cells as the load characteristic.

The data collection module 41 is configured to: receive key performance indicator information reported by the base station and determine the energy-consumption influencing factor data according to the key performance indicator information.

In an embodiment, the apparatus further includes a prediction management module that is configured to determine, according to a variation frequency of the load information of the target cell and a variation amplitude of the load information of the target cell, time to predict the load trend and/or a period to predict the load trend.

In an embodiment, the apparatus further includes a grouping module that is configured to divide the target cell according to a time characteristic of the energy-consumption influencing factor data, where the target cell includes at least one cell.

The energy-saving apparatus provided in this embodiment and the energy-saving method applied to a control unit provided in the preceding embodiments belong to the same concept. For technical details not described in this embodiment, reference may be made to any of the preceding embodiments.

Figure 15:
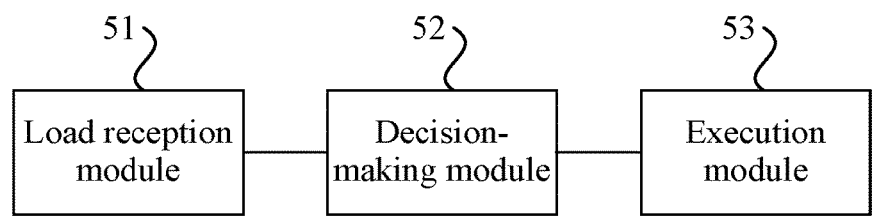
FIG. 15 is a structural diagram of an energy-saving apparatus according to another embodiment.

Embodiments of the present application further provide an energy-saving apparatus. FIG. 15 is a structural diagram of an energy-saving apparatus according to another embodiment. As shown in FIG. 15, the energy-saving apparatus includes a load reception module 51, a decision-making module 52, and an execution module 53.

The load reception module 51 is configured to receive indication information, where the indication information includes a load trend of a target cell.

The decision-making module 52 is configured to determine, according to the load trend, an energy-saving strategy of the target cell and effective time corresponding to the energy-saving strategy.

The execution module 53 is configured to execute the energy-saving strategy according to the effective time.

With the energy-saving apparatus of this embodiment, the load trend indicated by a control unit is received, the energy-saving strategy and the effective time are determined according to the load trend, and the energy-saving strategy is executed according to the effective time. The apparatus is applicable to actual situations in different network environments so that the energy-saving strategy is flexibly adjusted, energy-saving flexibility is improved, and energy consumption is reduced.

In an embodiment, the apparatus further includes an update module that is configured to, if the deviation between the load trend and load information of the target cell at a respective moment is greater than or equal to a set threshold, update the load trend according to the load information at the respective moment.

In an embodiment, the load trend includes load factor values corresponding to the target cell at multiple moments. The decision-making module 53 includes a comparison unit and a decision-making unit. The comparison unit is configured to compare a load factor value corresponding to each moment in the load trend with a respective energy-saving threshold. The decision-making unit is configured to, if the load factor value of the each moment is less than or equal to the respective energy-saving threshold, determine the energy-saving strategy of the target cell and use the each moment as the effective time corresponding to the energy-saving strategy.

In an embodiment, the decision-making module 53 is configured to determine, according to a discrete degree of time and a fluctuation degree of multiple load factor values in the load trend that are less than or equal to respective energy-saving thresholds, the energy-saving strategy of the target cell and the effective time corresponding to the energy-saving strategy.

In an embodiment, the decision-making module 53 is configured to: in the case where multiple consecutive load factor values each less than or equal to respective energy-saving thresholds exist in the load trend and a fluctuation degree of the multiple load factor values is smaller than or equal to a set degree, a first energy-saving strategy is adopted; in the case where multiple consecutive load factor values less than or equal to respective energy-saving thresholds do not exist in the load trend, a second energy-saving strategy is adopted; and in the case where multiple consecutive load factor values less than or equal to energy-saving thresholds exist in the load trend and a fluctuation degree of the multiple load factor values is larger than a set degree, a third energy-saving strategy is adopted; where an energy-saving response speed of the first energy-saving strategy is lower than an energy-saving response speed of the second energy-saving strategy; an energy-saving gain of the first energy-saving strategy is higher than an energy-saving gain of the second energy-saving strategy; and the third energy-saving strategy is a combination strategy of the first energy-saving strategy and the second energy-saving strategy.

In an embodiment, the apparatus further includes a reporting module that is configured to report key performance indicator information to the control unit, where the key performance indicator information includes energy-consumption influencing factor data.

The energy-saving apparatus provided in this embodiment and the energy-saving method applied to a base station provided in the preceding embodiments belong to the same concept. For technical details not described in this embodiment, reference may be made to any of the preceding embodiments.

Figure 16:
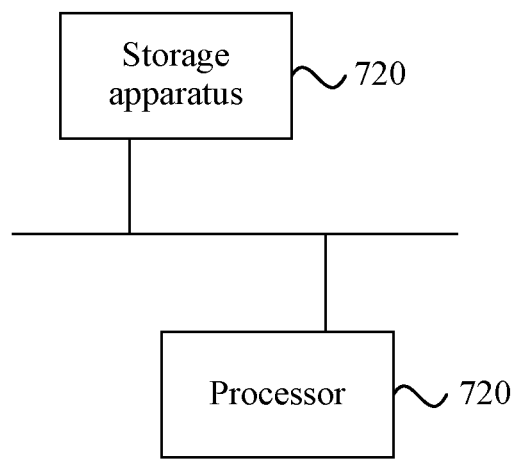
FIG. 16 is a schematic diagram of a hardware structure of a base station according to an embodiment.

Embodiments of the present application further provide a base station. The energy-saving method may be performed by an energy-saving apparatus that may be implemented by software and/or hardware and integrated in the base station. FIG. 16 is a schematic diagram of a hardware structure of a base station according to an embodiment. As shown in FIG. 16, the base station provided in this embodiment includes a processor 710 and a storage apparatus 720. The base station may include one or more processors. One processor 710 is used as an example in FIG. 16. The processor 710 and the storage apparatus 720 in the device may be connected via a bus or in other manners. The connection via the bus is used as an example in FIG. 16.

One or more programs are executed by one or more processors 710 to cause the one or more processors to implement the energy-saving method applied to a base station in any one of the preceding embodiments.

The method includes: collecting energy-consumption influencing factor data of a target cell; predicting a load trend of the target cell according to the energy-consumption influencing factor data; and determining, according to the load trend, an energy-saving strategy of the target cell and effective time corresponding to the energy-saving strategy and executing the energy-saving strategy according to the effective time.

Alternatively, the method includes: receiving indication information, where the indication information includes an energy-saving strategy of a target cell and effective time corresponding to the energy-saving strategy; and executing the energy-saving strategy according to the effective time.

Alternatively, the method includes: receiving indication information, where the indication information includes a load trend of a target cell; determining, according to the load trend, an energy-saving strategy of the target cell and effective time corresponding to the energy-saving strategy; and executing the energy-saving strategy according to the effective time.

As a computer-readable storage medium, the storage apparatus 720 in the base station may be configured to store one or more programs that may be software programs, computer-executable programs and modules, such as program instructions/modules (for example, modules in the energy-saving apparatus as shown in FIG. 11, which include a data collection module 10, a prediction module 11, a decision-making module 12, and an execution module 13) corresponding to the energy-saving method applied to a base station in the embodiments of the present application. The processor 710 executes software programs, instructions, and modules stored in the storage apparatus 720 to perform various function applications and data processing of the base station, that is, to implement the energy-saving method applied to a base station in the preceding method embodiments.

The storage apparatus 720 mainly includes a program storage region and a data storage region. The program storage region may store an operating system and an application program required by at least one function. The data storage region may store data (such as the energy-consumption influencing factor data and the load trend in the preceding embodiments) created based on use of the device. The storage apparatus 720 may include a high-speed random-access memory and may also include a non-volatile memory, such as at least one magnetic disk memory, a flash memory, or another non-volatile solid-state memory. In some examples, the storage apparatus 720 may include memories that are remotely disposed with respect to the processor 710. These remote memories may be connected to the base station via a network. Examples of the preceding network include, but are not limited to, the Internet, an intranet, a local area network, a mobile communication network, and a combination thereof.

When the one or more programs included in the base station are executed by the one or more processors 710, the following operations are performed: energy-consumption influencing factor data of a target cell is collected; a load trend of the target cell is predicted according to the energy-consumption influencing factor data; and an energy-saving strategy of the target cell and effective time corresponding to the energy-saving strategy are determined according to the load trend and the energy-saving strategy is executed according to the effective time.

Alternatively, the following operations are performed: indication information is received, where the indication information includes an energy-saving strategy of a target cell and effective time corresponding to the energy-saving strategy; and the energy-saving strategy is executed according to the effective time.

Alternatively, the following operations are performed: a load trend of a target cell is received; an energy-saving strategy of the target cell and effective time corresponding to the energy-saving strategy are determined according to the load trend; and the energy-saving strategy is executed according to the effective time.

The base station provided in this embodiment and the energy-saving method applied to a base station provided in the preceding embodiments belong to the same concept. For technical details not described in this embodiment, reference may be made to any of the preceding embodiments.

Embodiments of the present application further provide a control unit. The energy-saving method may be performed by an energy-saving apparatus that may be implemented by software and/or hardware and integrated in the control unit. The control unit refers to a control unit in a centralized network architecture, for example, a network management device.

Figure 17:
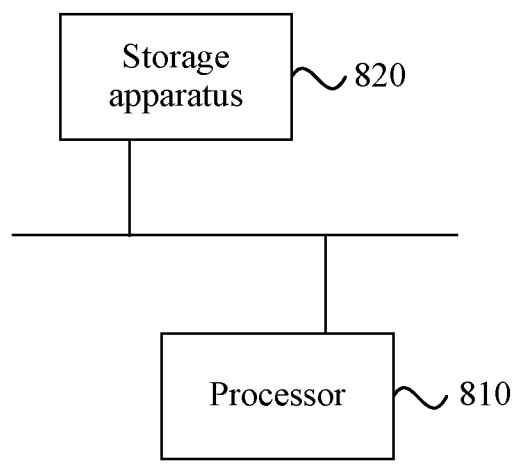
FIG. 17 is a schematic diagram of a hardware structure of a control unit according to an embodiment.

FIG. 17 is a schematic diagram of a hardware structure of a control unit according to an embodiment. As shown in FIG. 17, the control unit provided in this embodiment includes a processor 810 and a storage apparatus 820. The control unit may include one or more processors. One processor 810 is used as an example in FIG. 17. The processor 810 and the storage apparatus 820 in the device may be connected via a bus or in other manners. The connection via the bus is used as an example in FIG. 17.

One or more programs are executed by one or more processors 810 to cause the one or more processors to implement the energy-saving method applied to a control unit in any one of the preceding embodiments.

The method includes: collecting energy-consumption influencing factor data of a target cell; predicting a load trend of the target cell according to the energy-consumption influencing factor data; determining, according to the load trend, an energy-saving strategy of the target cell and effective time corresponding to the energy-saving strategy; and indicating the energy-saving strategy and the effective time to a base station.

Alternatively, the method includes: collecting energy-consumption influencing factor data of a target cell; predicting a load trend of the target cell according to the energy-consumption influencing factor data; and indicating the load trend to a base station.

As a computer-readable storage medium, the storage apparatus 820 in the control unit may be configured to store one or more programs that may be software programs, computer-executable programs and modules, such as program instructions/modules (for example, modules in the energy-saving apparatus as shown FIG. 12, which include a data collection module 20, a prediction module 21, a decision-making module 22, and a strategy indication module 23) corresponding to the energy-saving method applied to a control unit in the embodiments of the present application. The processor 810 executes software programs, instructions, and modules stored in the storage apparatus 820 to perform various function applications and data processing of the control unit, that is, to implement the energy-saving method applied to a control unit in the preceding method embodiments.

The storage apparatus 820 mainly includes a program storage region and a data storage region. The program storage region may store an operating system and an application program required by at least one function. The data storage region may store data (such as the energy-consumption influencing factor data and the load trend in the preceding embodiments) created based on use of the device. The storage apparatus 820 may include a high-speed random-access memory and may also include a non-volatile memory, such as at least one magnetic disk memory, a flash memory, or another non-volatile solid-state memory. In some examples, the storage apparatus 820 may include memories that are remotely disposed with respect to the processor 810. These remote memories may be connected to the control unit via a network. Examples of the preceding network include, but are not limited to, the Internet, an intranet, a local area network, a mobile communication network, and a combination thereof.

When the one or more programs included in the control unit are executed by the one or more processors 810, the following operations are performed: energy-consumption influencing factor data of a target cell is collected; a load trend of the target cell is predicted according to the energy-consumption influencing factor data; an energy-saving strategy of the target cell and effective time corresponding to the energy-saving strategy are determined according to the load trend; and the energy-saving strategy and the effective time are indicated to a base station.

Alternatively, the following operations are performed: energy-consumption influencing factor data of a target cell is collected; a load trend of the target cell is predicted according to the energy-consumption influencing factor data; and the load trend is indicated to a base station.

The control unit provided in this embodiment and the energy-saving method applied to a control unit provided in the preceding embodiments belong to the same concept. For technical details not described in this embodiment, reference may be made to any of the preceding embodiments.

Embodiments of the present application further provide a storage medium containing computer-executable instructions that, when executed by a computer processor, are used for performing an energy-saving method.

From the preceding description of embodiments, it is apparent to those skilled in the art that the present application may be implemented by use of software and general-purpose hardware or may be implemented by hardware. Based on this understanding, the technical solutions of the present application may be embodied in the form of a software product. The computer software product may be stored in a computer-readable storage medium, such as a floppy disk, a read-only memory (ROM), a random-access memory (RAM), a flash memory, a hard disk, or an optical disk of a computer and includes multiple instructions for causing a computer device (which may be a personal computer, a server, or a network device) to perform the method in any embodiment of the present application.

The preceding are only example embodiments of the present application and not intended to limit the scope of the present application.

A block diagram of any logic flow among the drawings of the present application may represent program steps, may represent interconnected logic circuits, modules, and functions, or may represent a combination of program steps with logic circuits, modules, and functions. Computer programs may be stored in a memory. The memory may be of any type appropriate for a local technical environment and may be implemented using any appropriate data storage technology, such as, but not limited to, a read-only memory (ROM), a random-access memory (RAM), and an optical memory device and system (a digital video disc (DVD) or a compact disk (CD)). Computer-readable media may include non-transitory storage media. A data processor may be of any type appropriate for the local technical environment, such as, but not limited to, a general-purpose computer, a special-purpose computer, a microprocessor, a digital signal processor (DSP), an application-specific integrated circuit (ASIC), a field-programmable gate array (FPGA), and a processor based on a multi-core processor architecture.

What is claimed is:

1. An energy-saving method, applied to a base station, comprising:
   collecting energy-consumption influencing factor data of a target cell;
   predicting a load trend of the target cell according to the energy-consumption influencing factor data; and
   determining, according to the load trend, an energy-saving strategy of the target cell and effective time corresponding to the energy-saving strategy and executing the energy-saving strategy according to the effective time;

wherein predicting the load trend of the target cell according to the energy-consumption influencing factor data comprises:
coding the energy-consumption influencing factor data to obtain coded data;
extracting a load characteristic of the target cell according to the coded data, wherein the load characteristic refers to a time series characteristic of a load as a function of time;
establishing a machine learning prediction model according to the load characteristic; and
predicting the load trend of the target cell through the machine learning prediction model;
wherein predicting the load trend of the target cell through the machine learning prediction model comprises: predicting, through the machine learning prediction model, load factor values corresponding to the target cell at a plurality of moments according to a set time granularity;
wherein the energy-consumption influencing factor data of the target cell comprises at least one of:
spatial information or information about a non-network factor;
the spatial information comprises a relationship between the target cell and a neighbor cell of the target cell, and load information of the neighbor cell;
wherein the information about the non-network factor comprises at least one of:
weather, road traffic congestion, special holidays, or important activities.

2. The method according to claim 1, further comprising:
ranking cells in a coverage range according to at least one of a number of times of service handover performed between the target cell and each of the cells or a distance between the target cell and each of the cells, and determining a set number of cells ranked first as neighbor cells.

3. The method according to claim 1, wherein establishing the machine learning prediction model according to the load characteristic comprises at least one of:
in a case where the load characteristic has periodicity and no trend, establishing the machine learning prediction model through a smoothing algorithm;
in a case where the load characteristic has periodicity and a trend, establishing the machine learning prediction model through a time series algorithm; or
in a case where the load characteristic has no periodicity, establishing the machine learning prediction model through a regression modeling algorithm.

4. The method according to claim 1, wherein extracting the load characteristic of the target cell according to the coded data comprises: in a case where the target cell comprises at least two cells and coded data of the at least two cells is divided into a same class through a clustering algorithm, using a centroid of the clustering algorithm corresponding to the at least two cells as the load characteristic of the target cell or using a mean of the coded data of the at least two cells or a median of the coded data of the at least two cells as the load characteristic of the target cell.

5. The method according to claim 1, further comprising:
in a case where a deviation between load information of the target cell at a respective moment and the load trend is greater than or equal to a set threshold, updating the load trend according to the load information at the respective moment.

6. The method according to claim 1, wherein the load trend comprises load factor values corresponding to the target cell at a plurality of moments; and
determining, according to the load trend, the energy-saving strategy of the target cell and effective time corresponding to the energy-saving strategy comprises:
comparing a load factor value corresponding to each moment in the load trend with a respective energy-saving threshold of the each moment; and
in a case where the load factor value of the each moment is less than or equal to the respective energy-saving threshold of the each moment, determining the energy-saving strategy of the target cell and using the each moment as the effective time corresponding to the energy-saving strategy.

7. The method according to claim 6, wherein determining, according to the load trend, the energy-saving strategy of the target cell and the effective time corresponding to the energy-saving strategy comprises:
determining, according to a discrete degree of time and a fluctuation degree of a plurality of load factor values in the load trend that are less than or equal to respective energy-saving thresholds, the energy-saving strategy of the target cell and the effective time corresponding to the energy-saving strategy.

8. The method according to claim 7, wherein determining, according to the load trend, the energy-saving strategy of the target cell and the effective time corresponding to the energy-saving strategy comprises:
in a case where a plurality of consecutive load factor values each less than or equal to respective energy-saving thresholds exist in the load trend and a fluctuation degree of the plurality of load factor values is smaller than or equal to a set degree, adopting a first energy-saving strategy;
in a case where a plurality of consecutive load factor values less than or equal to respective energy-saving thresholds do not exist in the load trend, adopting a second energy-saving strategy; and
in a case where a plurality of consecutive load factor values less than or equal to energy-saving thresholds exist in the load trend and a fluctuation degree of the plurality of load factor values is larger than a set degree, adopting a third energy-saving strategy;
wherein an energy-saving response speed of the first energy-saving strategy is lower than an energy-saving response speed of the second energy-saving strategy;
an energy-saving gain of the first energy-saving strategy is higher than an energy-saving gain of the second energy-saving strategy; and
the third energy-saving strategy is a combination strategy of the first energy-saving strategy and the second energy-saving strategy.

9. The method according to claim 1, wherein collecting the energy-consumption influencing factor data of the target cell comprises:
acquiring key performance indicator information of the neighbor cell through a core network device or a communication interface between the base station and an adjacent base station.

10. The method according to claim 1, further comprising:
determining, according to a variation frequency of the load information of the target cell and a variation amplitude of the load information of the target cell, at least one of time to predict the load trend or a period to predict the load trend.

11. The method according to claim 1, further comprising:
dividing the target cell according to a time characteristic of the energy-consumption influencing factor data, wherein the target cell comprises at least one cell.

12. An energy-saving method, applied to a control unit, comprising:
collecting energy-consumption influencing factor data of a target cell;
predicting a load trend of the target cell according to the energy-consumption influencing factor data;
determining, according to the load trend, an energy-saving strategy of the target cell and effective time corresponding to the energy-saving strategy; and
indicating the energy-saving strategy and the effective time to a base station;
wherein predicting the load trend of the target cell according to the energy-consumption influencing factor data comprises:
coding the energy-consumption influencing factor data to obtain coded data;
extracting a load characteristic of the target cell according to the coded data, wherein the load characteristic refers to a time series characteristic of a load as a function of time;
establishing a machine learning prediction model according to the load characteristic; and
predicting the load trend of the target cell through the machine learning prediction model;
wherein predicting the load trend of the target cell through the machine learning prediction model comprises: predicting, through the machine learning prediction model, load factor values corresponding to the target cell at a plurality of moments according to a set time granularity;
wherein the energy-consumption influencing factor data of the target cell comprises at least one of:
spatial information or information about a non-network factor;
the spatial information comprises a relationship between the target cell and a neighbor cell of the target cell, and load information of the neighbor cell;
wherein the information about the non-network factor comprises at least one of:
weather, road traffic congestion, special holidays, or important activities.

13. The method according to claim 12, wherein collecting the energy-consumption influencing factor data of the target cell comprises:
receiving key performance indicator information reported by the base station and determining the energy-consumption influencing factor data according to the key performance indicator information.

14. A base station, comprising:
at least one processor; and
a storage apparatus configured to store at least one program;
wherein the at least one program, when executed by the at least one processor, causes the at least one processor to implement the energy-saving method according to claim 1.

15. A control unit, comprising:
at least one processor; and
a storage apparatus configured to store at least one program;
wherein the at least one program, when executed by the at least one processor, causes the at least one processor to implement the energy-saving method according to claim 12.

16. A non-transitory computer-readable storage medium for storing computer programs that, when executed by a processor, implement the energy-saving method according to claim 1.

17. A non-transitory computer-readable storage medium for storing computer programs that, when executed by a processor, implement the energy-saving method according to claim 12.

* * * * *